United States Patent
Sakai

(10) Patent No.: US 9,981,604 B2
(45) Date of Patent: May 29, 2018

(54) OBJECT DETECTOR AND SENSING APPARATUS

(71) Applicant: Kohji Sakai, Tokyo (JP)

(72) Inventor: Kohji Sakai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 125 days.

(21) Appl. No.: 14/837,552

(22) Filed: Aug. 27, 2015

(65) Prior Publication Data

US 2016/0096474 A1    Apr. 7, 2016

(30) Foreign Application Priority Data

Oct. 2, 2014    (JP) .................................. 2014-204283

(51) Int. Cl.
| | |
|---|---|
| *B60Q 1/00* | (2006.01) |
| *B60Q 9/00* | (2006.01) |
| *G01S 17/93* | (2006.01) |
| *G01S 17/42* | (2006.01) |
| *G01S 7/481* | (2006.01) |

(52) U.S. Cl.
CPC ............ *B60Q 9/008* (2013.01); *G01S 7/4815* (2013.01); *G01S 7/4817* (2013.01); *G01S 17/42* (2013.01); *G01S 17/936* (2013.01)

(58) Field of Classification Search
CPC ....... G01S 17/42; G01S 17/936; G08G 1/165; G06K 9/00805; G06K 9/2036
USPC ........................................................ 340/435
See application file for complete search history.

(56) References Cited

U.S. PATENT DOCUMENTS

| | | | | |
|---|---|---|---|---|
| 5,552,893 A | * | 9/1996 | Akasu ...................... | G01C 3/00 356/4.01 |
| 5,864,391 A | * | 1/1999 | Hosokawa ............ | G01S 7/4817 356/4.01 |
| 7,544,945 B2 | * | 6/2009 | Tan ........................ | G01S 7/4811 180/169 |
| 8,040,565 B2 | * | 10/2011 | Shibaki ................ | H04N 1/4072 358/1.9 |
| 9,568,605 B2 | * | 2/2017 | Akatsu ............... | H05B 37/0227 |
| 2009/0034002 A1 | | 2/2009 | Shibaki et al. | |

(Continued)

FOREIGN PATENT DOCUMENTS

| | | |
|---|---|---|
| JP | 5-150045 | 6/1993 |
| JP | 9-274076 | 10/1997 |

(Continued)

OTHER PUBLICATIONS

U.S. Appl. No. 14/658,541 filed Mar. 16, 2015.

*Primary Examiner* — Eric M Blount
(74) *Attorney, Agent, or Firm* — Oblon, McClelland, Maier & Neustadt, L.L.P.

(57) ABSTRACT

An object detector is provided including a light emitter including at least a light source having a plurality of light emitting areas disposed along a first direction to emit light, an optical scanner configured to scan the light emitted from the light emitter along a second direction that is different from the first direction, a light receiver configured to receive the light that is scanned by the optical scanner and then is reflected at an object, and a controller configured to divide a detection field into a plurality of subareas in a third direction that is orthogonal to the second direction, where a number of partitions of the detection field is variable.

14 Claims, 28 Drawing Sheets

(56) References Cited

U.S. PATENT DOCUMENTS

| | | | |
|---|---|---|---|
| 2014/0036071 A1* | 2/2014 | Nakamura | G01J 1/0422 348/135 |
| 2015/0124238 A1 | 5/2015 | Sakai et al. | |
| 2015/0160341 A1 | 6/2015 | Akatsu et al. | |
| 2015/0204977 A1 | 7/2015 | Sakai | |
| 2016/0274223 A1* | 9/2016 | Imai | G01S 17/42 |

FOREIGN PATENT DOCUMENTS

| | | |
|---|---|---|
| JP | 2009-037283 | 2/2009 |
| JP | 2010-096574 | 4/2010 |
| JP | 2015-111090 | 6/2015 |
| JP | 2015-129734 | 7/2015 |
| JP | 2015-137951 | 7/2015 |

* cited by examiner

DETECTION DISTANCE    Ls

OBJECT DETECTOR AND SENSING APPARATUS

CROSS-REFERENCE TO RELATED APPLICATION

This patent application is based on and claims priority pursuant to 35 U.S.C. § 119(a) to Japanese Patent Application No. 2014-204283, filed on Oct. 2, 2014, in the Japan Patent Office, the entire disclosure of which is hereby incorporated by reference herein.

BACKGROUND

Technical Field

Embodiments of the present invention relate to an object detector and a sensing apparatus.

Background Art

Currently, object detectors that detect the presence or absence of an object or the distance to the object are being developed.

For example, laser radar devices are known that are mounted on vehicles to emit laser beam to the space ahead of the vehicle in the direction of travel and detect an object based on the light reflected from the object.

However, it is difficult for conventional devices to achieve both improvement in the resolution of detection and enhancement of the longevity of a light source.

SUMMARY

Embodiments of the present invention described herein provide an object detector including a light emitter including at least a light source having a plurality of light emitting areas disposed along a first direction to emit light, an optical scanner configured to scan the light emitted from the light emitter along a second direction that is different from the first direction, a light receiver configured to receive the light that is scanned by the optical scanner and then is reflected at an object, and a controller configured to divide a detection field into a plurality of subareas in a third direction that is orthogonal to the second direction, where a number of partitions of the detection field is variable.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

Figure 1:
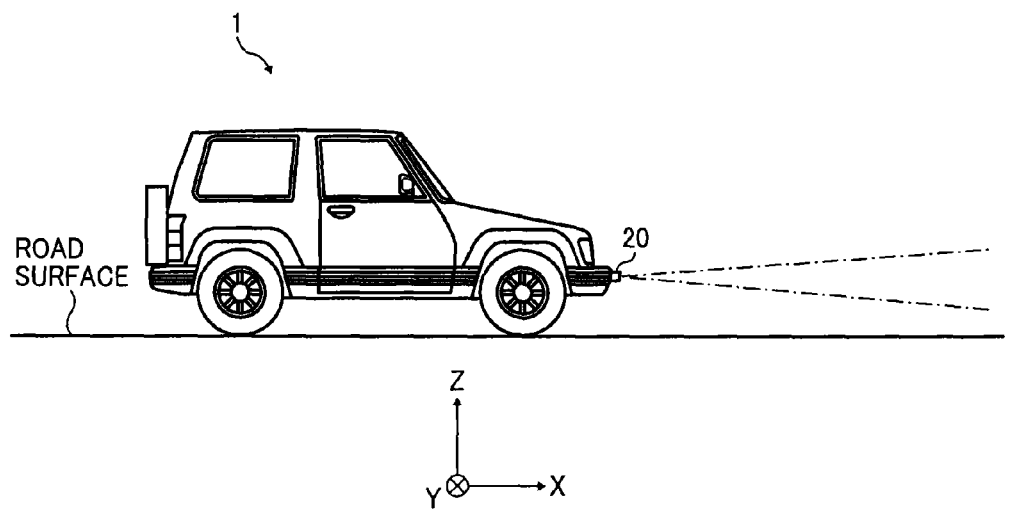
FIG. 1 is a diagram illustrating the external appearance of a vehicle for which a laser radar is provided, according to an embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Note that in the following description and the claims, multiplication is denoted by the symbol "*".

In describing embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, some embodiments of the present invention are described with reference to FIG. 1 to FIG. 41. FIG. 1 illustrates the external appearance of a vehicle 1 for which a laser radar 20 is provided as an object detector, according to an embodiment of the present invention.

The laser radar 20 is fitted, for example, to a portion near the license plate disposed at the front of the vehicle 1. In the XYZ three-dimensional orthogonal coordinate system according to the present embodiment, it is assumed that the direction orthogonal to the road surface is the Z-axis direction, and that the traveling direction of the vehicle 1 is the +X direction.

Figure 2:
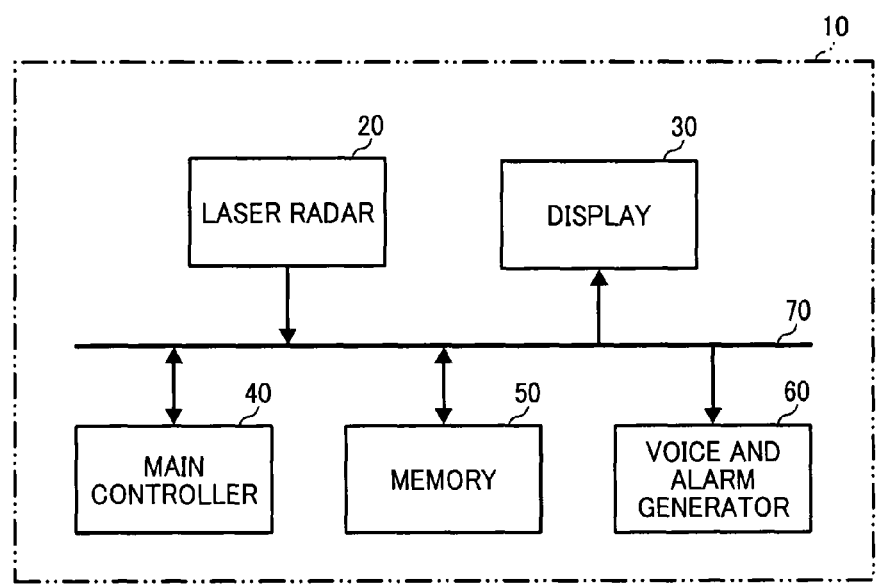
FIG. 2 is a block diagram of the configuration of a monitoring apparatus according to an embodiment of the present invention.

FIG. 2 is a block diagram of the configuration of a monitoring apparatus 10 according to the present embodiment. In the vehicle 1, as depicted in FIG. 2 for example, a display 30, a main controller 40, a memory 50, and a voice and alarm generator 60 are provided. These elements are electrically connected to each other through a bus 70 through which data can be transmitted.

In the present embodiment, the monitoring apparatus 10 that serves as a sensing apparatus includes the laser radar 20, the display 30, the main controller 40, the memory 50, and the voice and alarm generator 60. The monitoring apparatus 10 is fitted to the vehicle 1.

Figure 3:
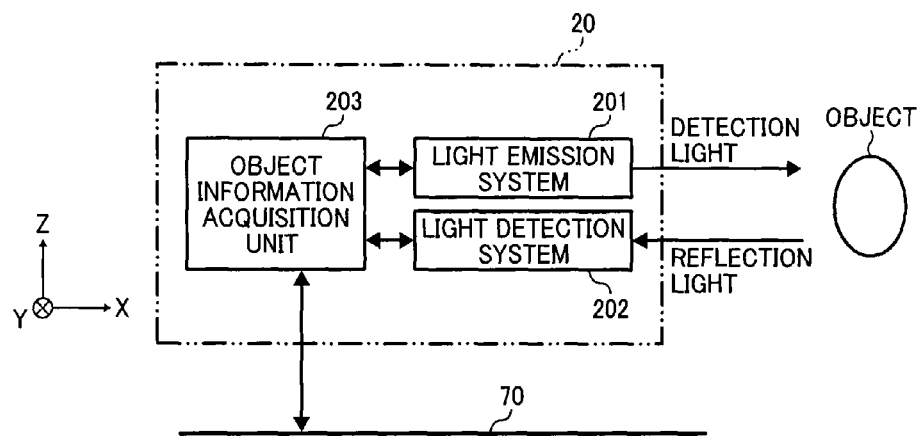
FIG. 3 is a diagram illustrating the configuration of a laser radar according to an embodiment of the present invention.

FIG. 3 is a diagram illustrating the configuration of the laser radar 20 according to the present embodiment. As illustrated in FIG. 3 for example, the laser radar 20 includes a light emission system 201, a light detection system 202, and an object information acquisition unit 203. The light emission system 201 emits detection light in the +X direction, and the light detection system 202 detects the light reflected at an object. The object information acquisition unit 203 controls the light emission system 201, and obtains object information such as the presence or absence of the object, the distance to the object, the dimension of the object, the shape of the object, and the position of the object, based on the result of the detection performed by the light detection system 202. In the present embodiment, the light emission system 201 is arranged on the +Z side of the light detection system 202. Note that the light emission system 201, the light detection system 202, and the object information acquisition unit 203 are accommodated in a housing.

Figure 4:
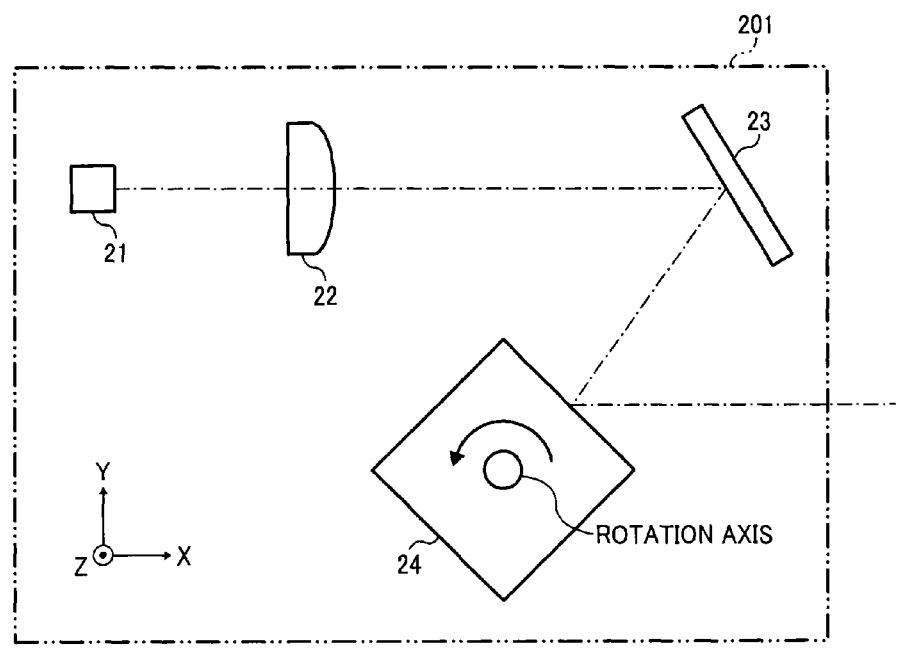
FIG. 4 is a diagram illustrating a light emission system according to an embodiment of the present invention.
Figure 5:
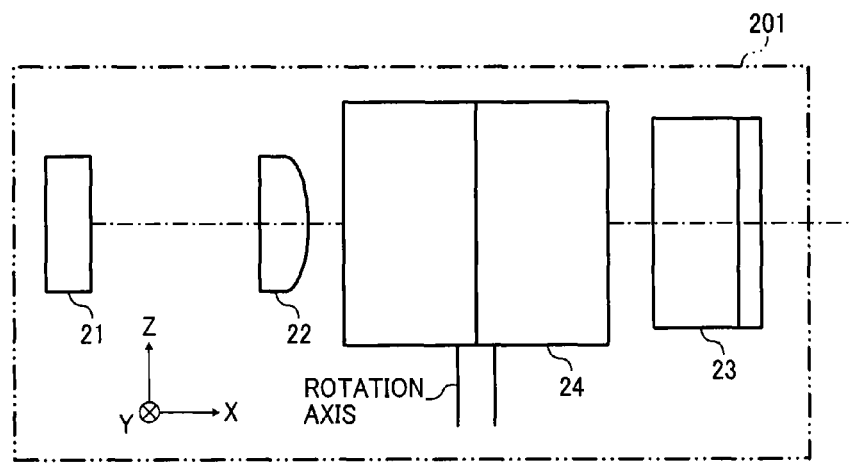
FIG. 5 is another diagram illustrating a light emission system according to an embodiment of the present invention.

FIG. 4 and FIG. 5 are diagrams illustrating the light emission system 201 according to the present embodiment. As illustrated in FIG. 4 and FIG. 5, the light emission system 201 includes, for example, a light source 21, a coupling lens 22, a first reflecting mirror 23, and a first rotating mirror 24.

Figure 6:
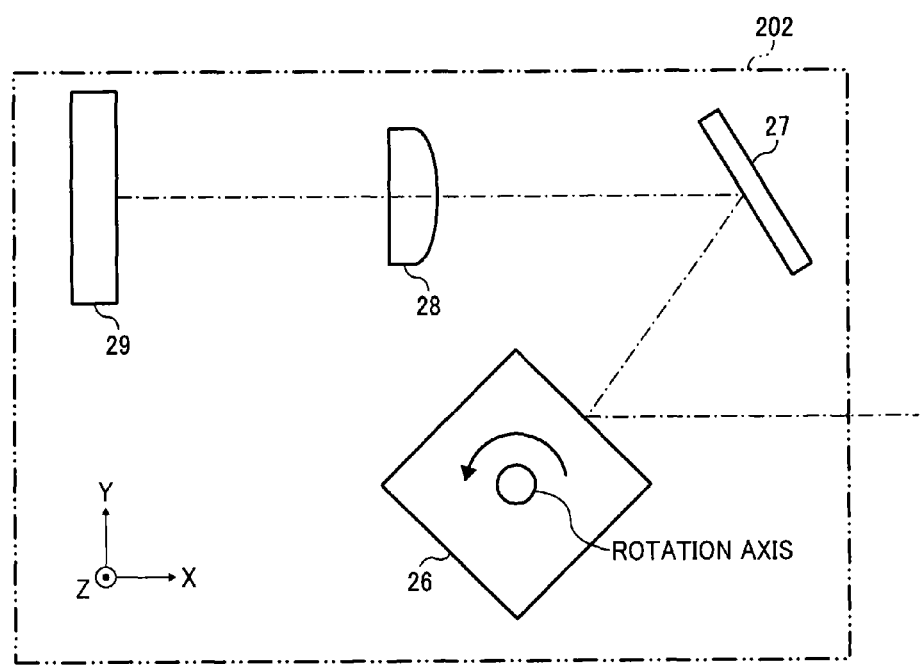
FIG. 6 is a diagram illustrating a light detection system according to an embodiment of the present invention.
Figure 7:
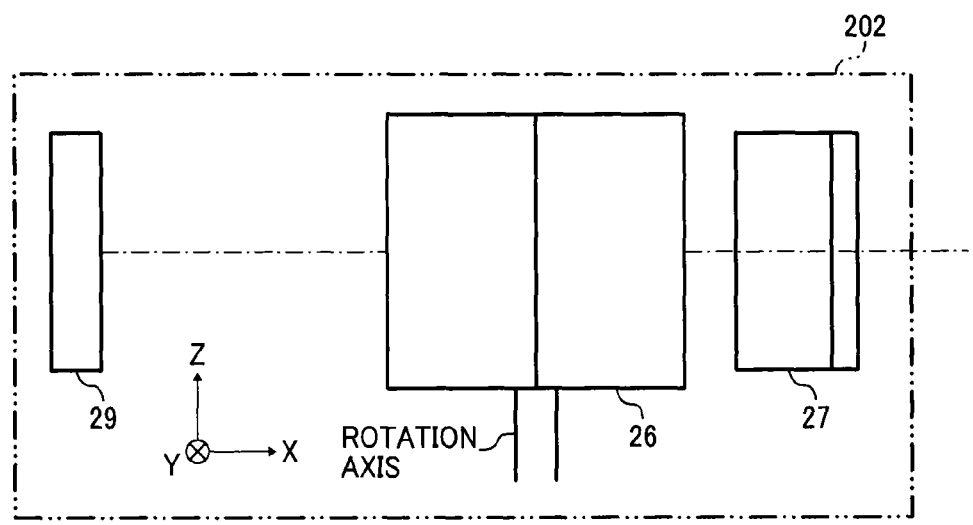
FIG. 7 is another diagram illustrating a light detection system according to an embodiment of the present invention.

FIG. 6 and FIG. 7 are diagrams illustrating the light detection system 202 according to the present embodiment. As illustrated in FIG. 6 and FIG. 7, the light detection system 202 includes, for example, a second rotating mirror 26, a second reflecting mirror 27, an imaging lens 28, and a light detector 29.

Figure 8:
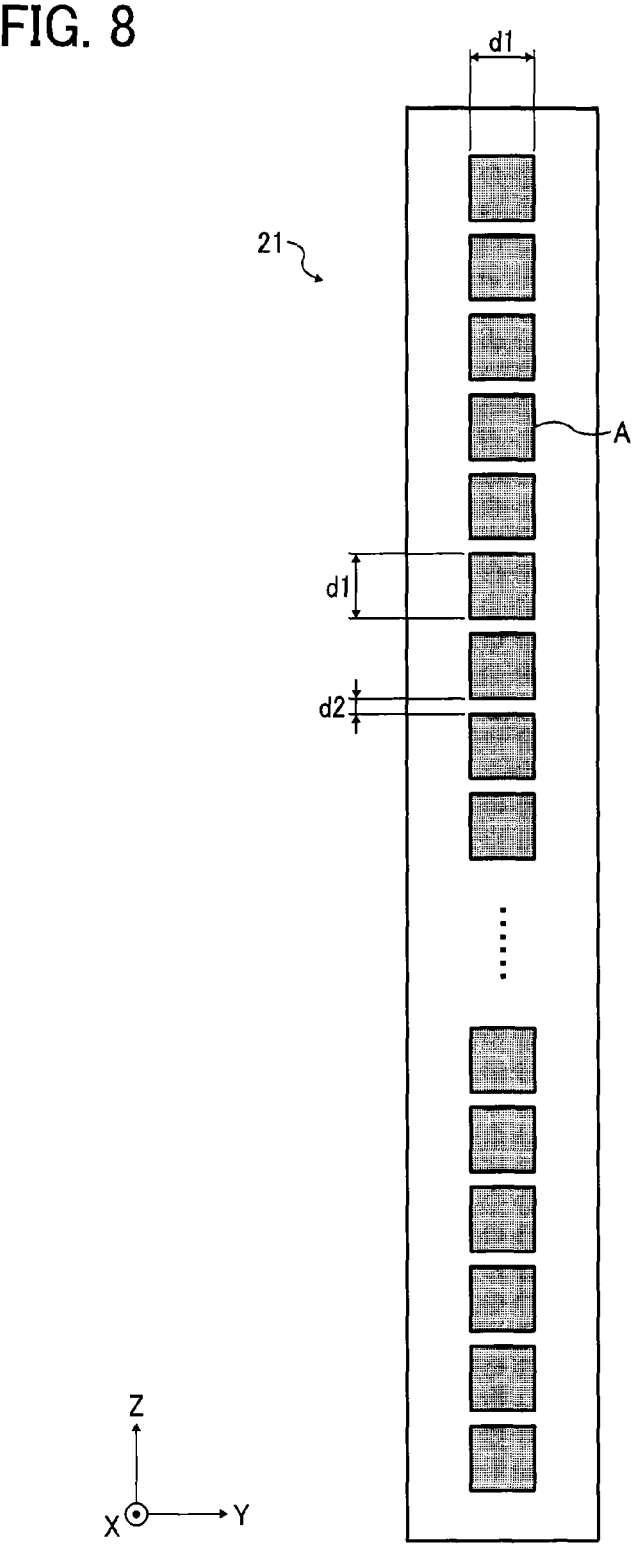
FIG. 8 is a diagram illustrating a plurality of light emitting areas of a light source according to an embodiment of the present invention.

FIG. 8 is a diagram illustrating a plurality of light emitting areas A of the light source 21 according to the present embodiment. As illustrated in FIG. 8 for example, the light emitting areas A of the light source 21 are arranged in the Z-axis direction at regular intervals. In the present embodiment, the light emitting areas are square-shaped where the length of each side is d1. Moreover, the gap between two neighboring light emitting areas is d2.

Figure 9:
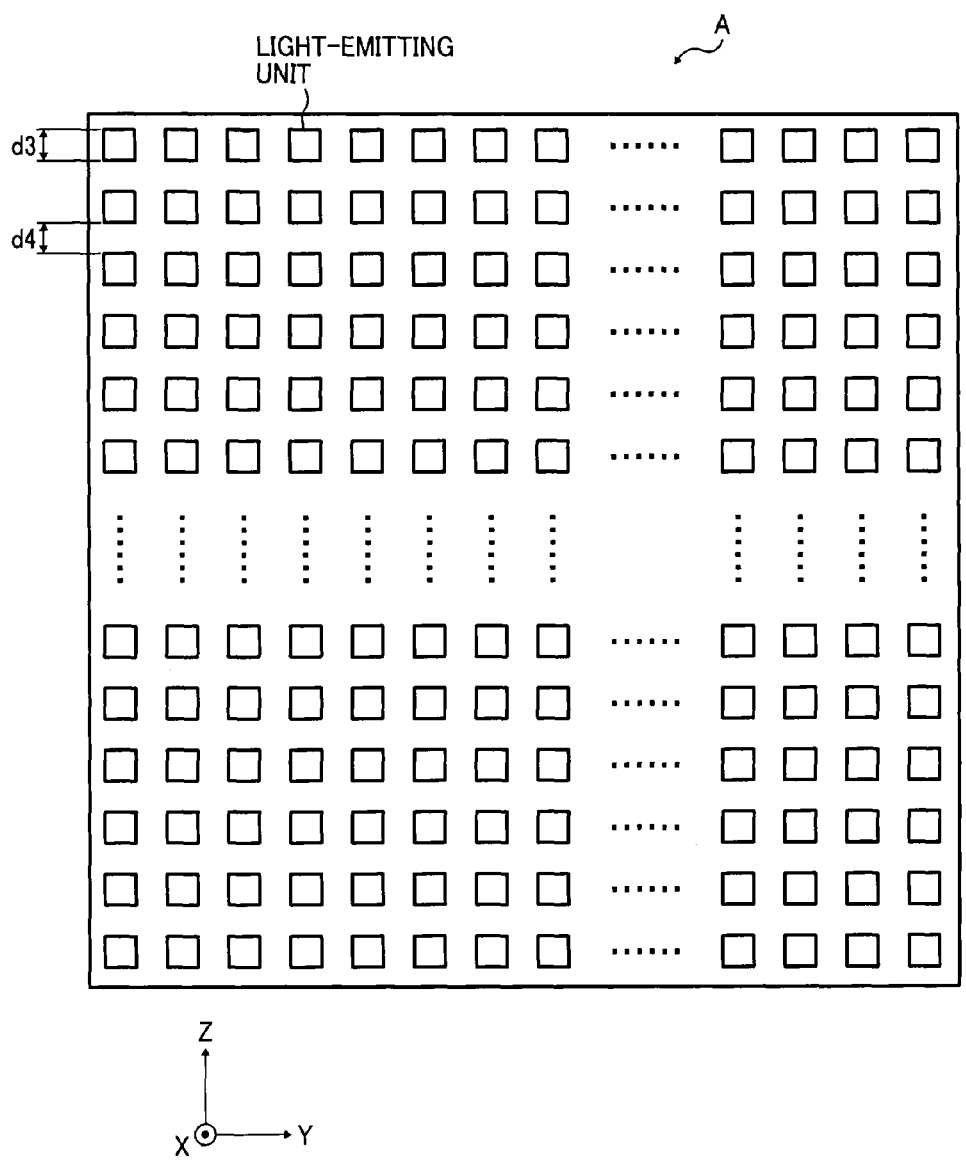
FIG. 9 is a diagram illustrating a plurality of light-emitting units in each light emitting area, according to an embodiment of the present invention.

FIG. 9 is a diagram illustrating a plurality of light-emitting units in each of the light emitting areas A, according to the present embodiment. As illustrated in FIG. 9 for example, a plurality of light-emitting units are two-dimensionally arranged in each of the light emitting areas A. In the present embodiment, the light-emitting units are square-shaped where the length of each side is d3. Moreover, the gap between two neighboring light-emitting units is d4. The dimension of the above d1 is determined by the number of the light-emitting units that are included in a light emitting area.

Each of the light-emitting units is a vertical cavity-surface emitting laser (VCSEL). In other words, the light source 21 serves as a so-called surface emitting laser array.

The light-emitting units are switched on and switched off by the object information acquisition unit 203. Each of the switched-on light-emitting units emits light in the +X direction.

The coupling lens 22 is arranged on the +X side of the light source 21. Alternatively, the coupling lens 22 may be replaced with a coupling optical system with equivalent capability and a plurality of optical elements.

The first reflecting mirror 23 reflects the light that has passed through the coupling lens 22 so as to be directed to the first rotating mirror 24.

The first rotating mirror 24 has a plurality of specular surfaces (reflection planes) that rotate on the rotation axis parallel to the Z axis, and scans the light from the first reflecting mirror 23 along the Y-axis direction. Each of the specular surfaces of the first rotating mirror 24 is parallel to the rotation axis. In the present embodiment, the first rotating mirror 24 has four specular surfaces. In other words, the object information acquisition unit 203 controls the rotation of the first rotating mirror 24. The light that is reflected at the specular surfaces of the first rotating mirror 24 is the detection light that is emitted from the laser radar 20.

Figure 10:
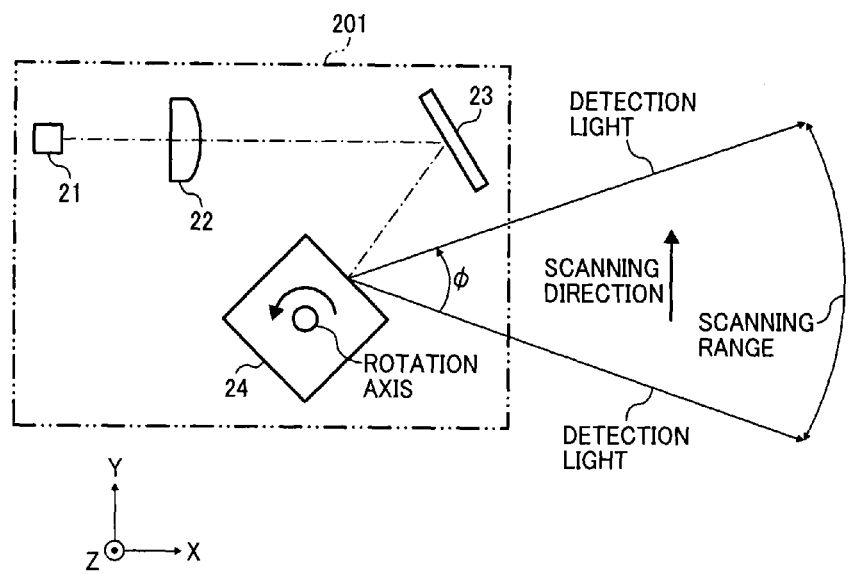
FIG. 10 is a diagram illustrating the scanning range of a first rotating mirror, according to an embodiment of the present invention.

FIG. 10 is a diagram illustrating the scanning range of the first rotating mirror 24, according to the present embodiment. As illustrated in FIG. 10 for example, when the first rotating mirror 24 rotates, the detection light path changes on a plane orthogonal to the Z-axis direction. Accordingly, the detection light is scanned along the Y-axis direction as the first rotating mirror rotates. In the present embodiment, the detection light is scanned in the +Y direction. In the following description, the angle φ which the detection light path that is directed to an edge on the −Y side of the scanning area forms with the detection light path that is directed to an edge on the +Y side of the scanning area, on the plane orthogonal to the Z axis, may be referred to as a scanning angle (see FIG. 10).

When an object is present in the detection field, a part of the light that is emitted from the laser radar 20 and is reflected at the object returns to the laser radar 20. In the following description, the light that is reflected at the object and returns to the laser radar 20 may be referred to simply as light reflected from an object.

The second rotating mirror 26 has a plurality of specular surfaces that rotate on the rotation axis parallel to the Z axis, and reflects the light reflected from an object so as to be directed to the mirror surface of the second reflecting mirror 27. Each of the specular surfaces of the second rotating mirror 26 is parallel to the rotation axis. In the present embodiment, the second rotating mirror 26 has four specular surfaces. The object information acquisition unit 203 controls the rotation of the second rotating mirror 26.

The object information acquisition unit 203 controls the first rotating mirror 24 and the second rotating mirror 26 so as to synchronize with each other and have the same rotation angle. Each of the first rotating mirror 24 and the second rotating mirror 26 is provided with a sensor that detects the rotation angle (for example, a Hall effect sensor), and the output signal from each sensor is sent to the object information acquisition unit 203. In other words, the object information acquisition unit 203 can obtain the rotation angles of the first rotating mirror 24 and the second rotating mirror 26 based on the output signals from the sensors.

The second reflecting mirror 27 reflects the light from the second rotating mirror 26 in the −X direction.

The imaging lens 28 is arranged on the −X side of the second reflecting mirror 27, and collects and condenses the light reflected by second reflecting mirror 27.

The light detector 29 receives the light that has passed through the imaging lens 28, and outputs a signal to the object information acquisition unit 203 according to the amount of the received light. The object information acquisition unit 203 determines that the light detector 29 has received the light reflected from an object when the output level of the light detector 29 becomes equal to or greater than a prescribed threshold. As the light receiving element of the light detector 29, an avalanche photo diode (APD) or any known pin photodiode may be used.

The object information acquisition unit 203 switches on and switches off the light source 21, and controls the driving of the first rotating mirror 24 and the second rotating mirror 26. The object information acquisition unit 203 acquires object information regarding whether or not an object is present, based on the signal output from the light detector 29. When it is determined that an object is present, the object information acquisition unit 203 acquires object information including the distance to the object, based on the timing of light emission at the light source 21 and the timing of light reception at the light detector 29.

<First Arrangement of Coupling Lens and Imaging Lens>

Figure 11:
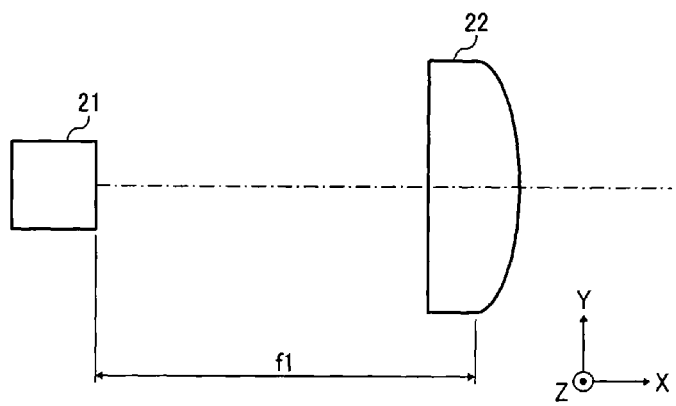
FIG. 11 is a diagram illustrating the relative position of a coupling lens in a first example arrangement of an embodiment of the present invention.

FIG. 11 is a diagram illustrating the relative position of the coupling lens 22 in the first example arrangement of the present embodiment. In the first example arrangement, as illustrated in FIG. 11, the coupling lens 22 is disposed in the X-axis direction such that the distance from the light source 21 matches the focal length ($f_1$) of the coupling lens 22.

Figure 12:
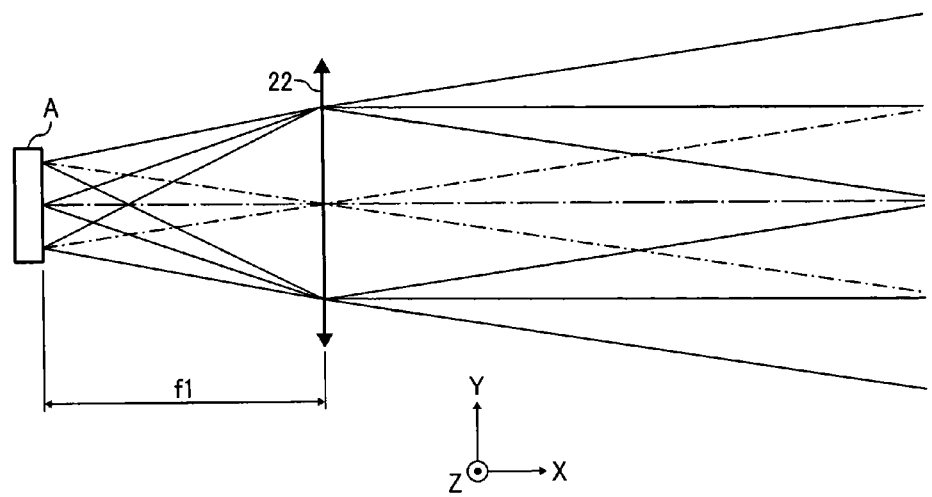
FIG. 12 is a diagram illustrating the light that has passed through a coupling lens in a first example arrangement of an embodiment of the present invention.

FIG. 12 is a diagram illustrating the light that has passed through the coupling lens 22 in the first example arrangement of the present embodiment. In such cases, the light that is emitted from one light-emitting unit of the light source 21 is approximately collimated by the coupling lens 22. However, in the present embodiment, a plurality of light-emitting units of each of the light emitting areas A are turned on at the same time. For this reason, the light that is emitted from each of the light emitting areas A becomes diverging light after passing through the coupling lens 22 (see FIG. 12). As a result, a conjugate image of the light source 21 is formed at infinity by the coupling lens 22.

Figure 13:
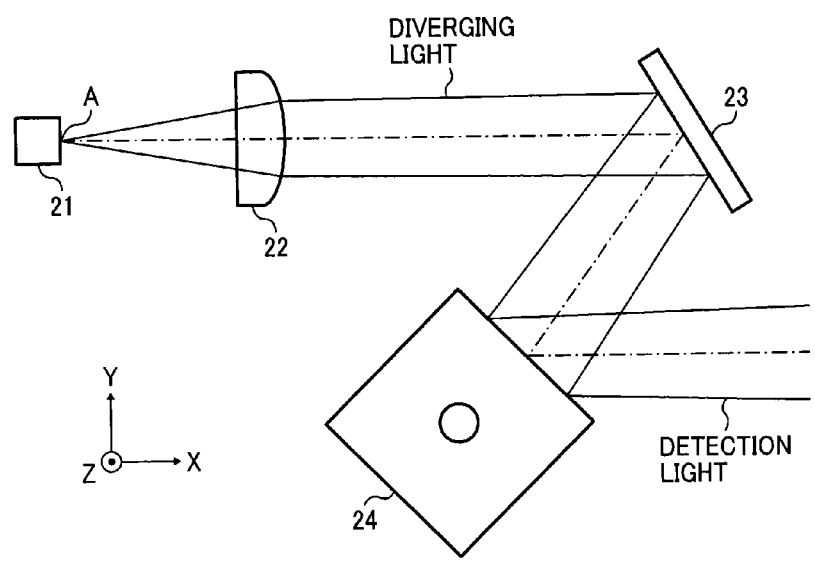
FIG. 13 is a diagram illustrating the optical path of the light emitted from a light emitting area A in a first example arrangement of an embodiment of the present invention.
Figure 14:
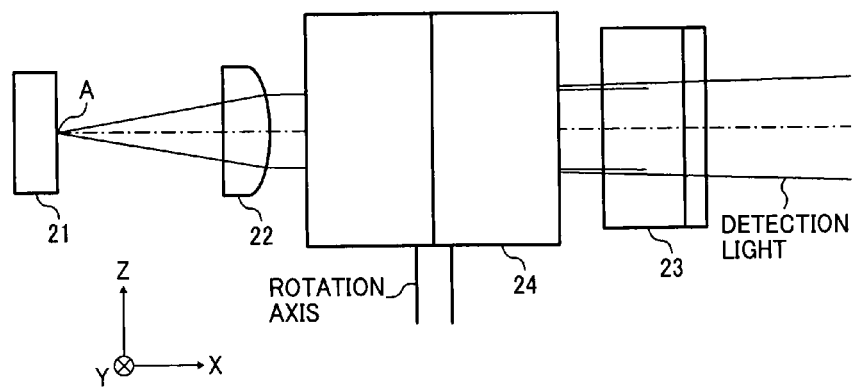
FIG. 14 is another diagram illustrating the optical path of the light emitted from a light emitting area A in a first example arrangement of an embodiment of the present invention.

FIG. 13 and FIG. 14 are diagrams illustrating an example of the optical path of the light emitted from one of the light emitting areas A of the light source 21 in the first example arrangement of the present embodiment.

Figure 15:
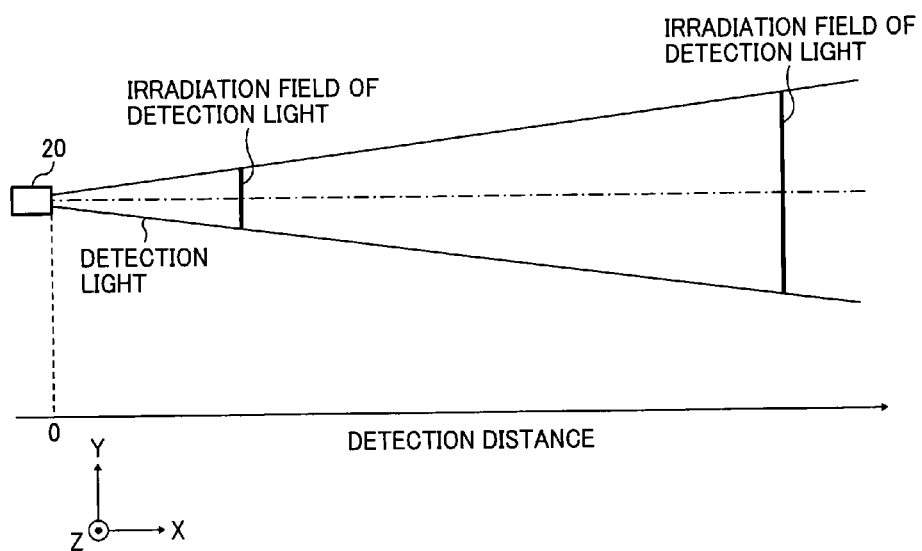
FIG. 15 is a diagram illustrating the irradiation field of detection light in a first example arrangement of an embodiment of the present invention.

FIG. 15 is a diagram illustrating the irradiation field of detection light in the first example arrangement of the present embodiment. As the detection light emitted from the laser radar 20 is diverging light, as illustrated in FIG. 15 for example, the size of the irradiation field of the detection light varies depending on the detection distance. In the following description, for the purposes of simplification, the irradiation field of the detection light may be referred to simply as an irradiation field.

Figure 16:
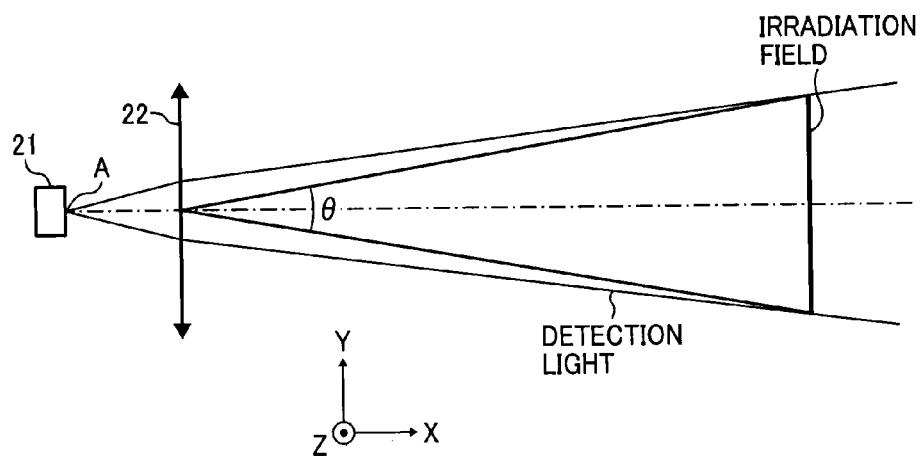
FIG. 16 is a diagram illustrating the definition of glancing angle θ according to an embodiment of the present invention.

FIG. 16 is a diagram illustrating the definition of glancing angle θ according to the present embodiment. As illustrated in FIG. 16 for example, in the present embodiment, the angle of divergence θ of the irradiation field where the center of the coupling lens 22 is the viewpoint is defined to be the glancing angle.

Figure 17:
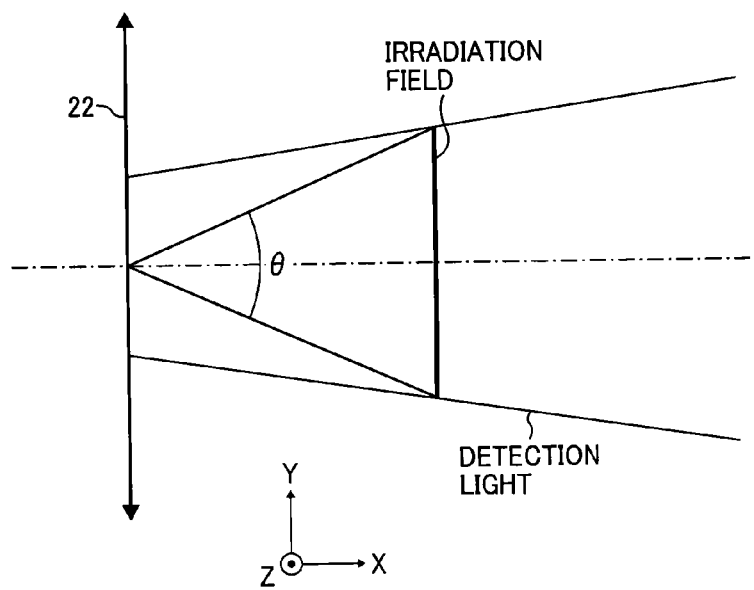
FIG. 17 is a diagram illustrating glancing angle θ in a first example arrangement of an embodiment of the present invention.
Figure 18:
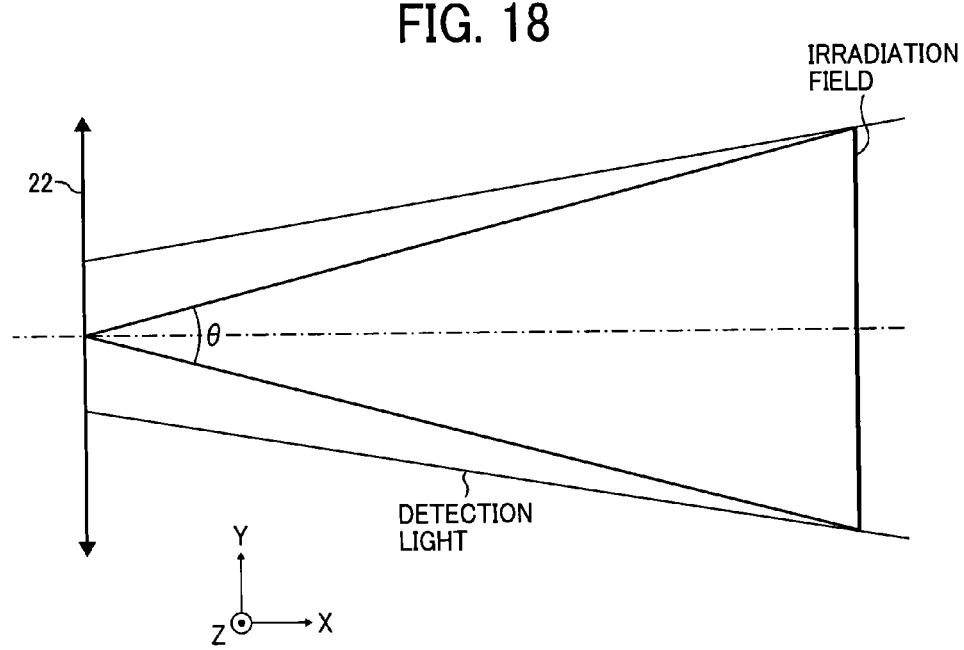
FIG. 18 is another diagram illustrating glancing angle θ in a first example arrangement of an embodiment of the present invention.

FIG. 17 and FIG. 18 are diagrams illustrating the glancing angle θ in the first example arrangement of the present embodiment. As illustrated in FIG. 17 and FIG. 18, the glancing angle becomes greater as the detection distance is smaller.

Figure 19:
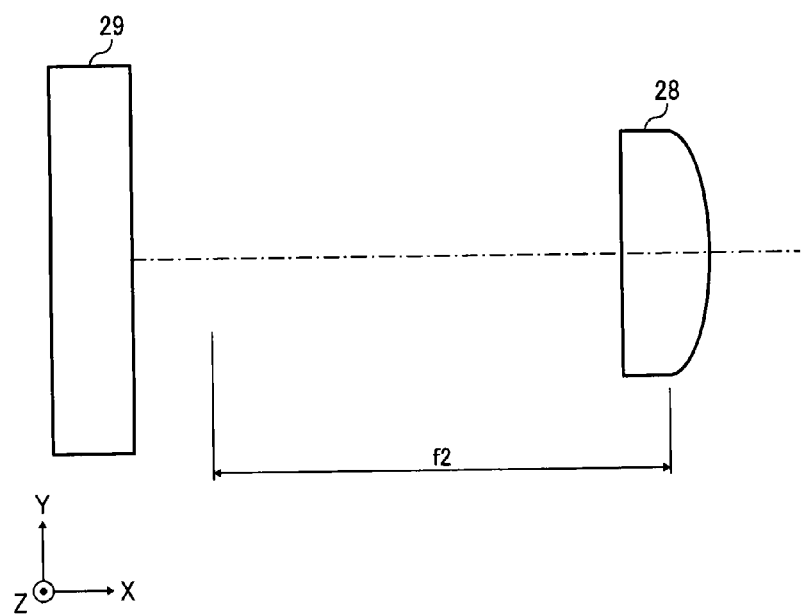
FIG. 19 is a diagram illustrating the relative position of an imaging lens in a first example arrangement of an embodiment of the present invention.

FIG. 19 is a diagram illustrating the relative position of the imaging lens 28 in the first example arrangement of the present embodiment. As illustrated in FIG. 19, the imaging lens 28 is disposed in the X-axis direction such that the distance from the light detector 29 becomes greater than the focal length ($f_2$) of the imaging lens 28.

Figure 20:
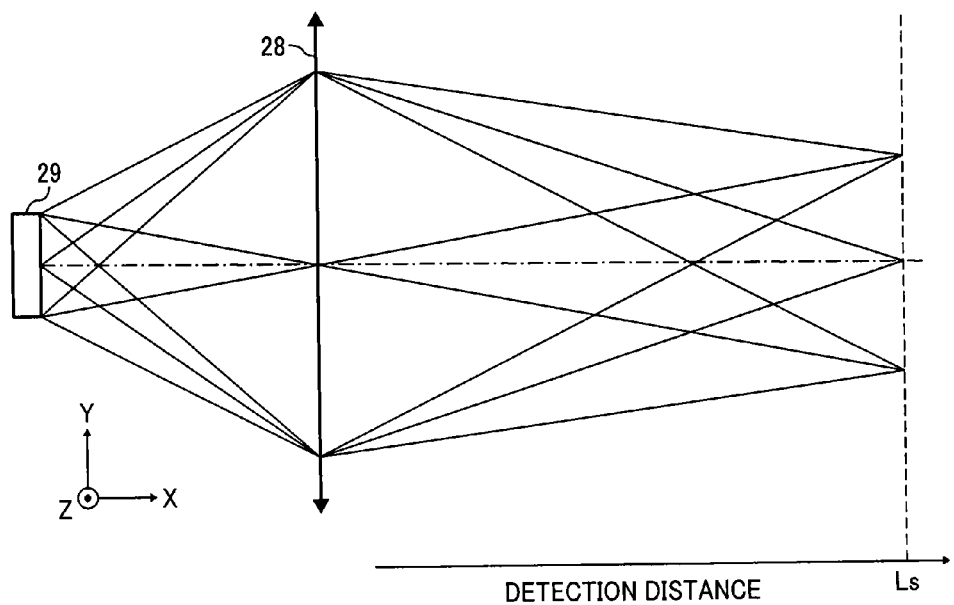
FIG. 20 is a diagram illustrating the conjugate points of a light detector in a first example arrangement of an embodiment of the present invention.

FIG. 20 is a diagram illustrating the conjugate points of the light detector 29 in the first example arrangement of the present embodiment. Assuming that the light detector 29 is the object point, as illustrated in FIG. 20, the imaging lens 28 is arranged such that a conjugate image of the light detector 29 is formed by the imaging lens 28 at $L_S$ that indicates the distance from the laser radar 20 in the X-axis direction. In other words, the $L_S$ indicates the position at which a conjugate image of the light detector 29 is formed by the imaging lens 28. In the present embodiment, $L_S$=80 m by way of example.

Figure 21:
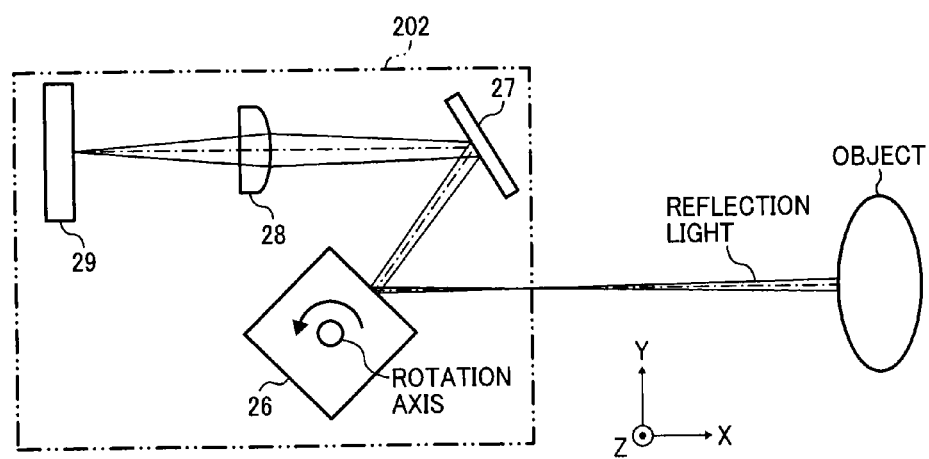
FIG. 21 is a diagram illustrating the optical path of the light reflected from an object in a first example arrangement of an embodiment of the present invention.
Figure 22:
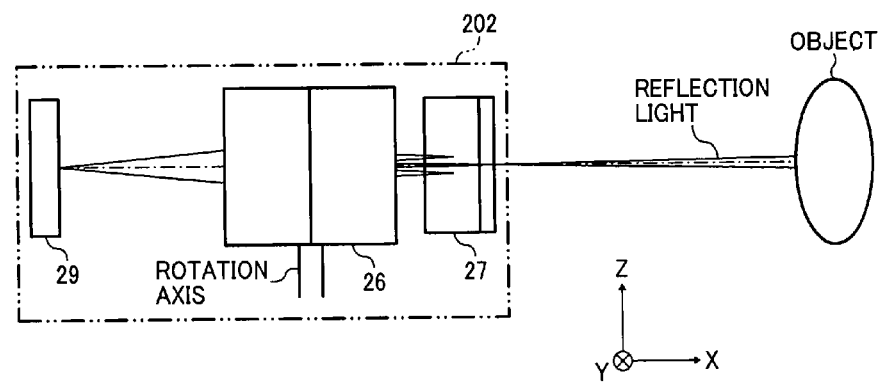
FIG. 22 is another diagram illustrating the optical path of the light reflected from an object in a first example arrangement of an embodiment of the present invention.

FIG. 21 and FIG. 22 are diagrams illustrating an example of the optical path of the light reflected from an object in the first example arrangement of the present embodiment.

In the first example arrangement, the coupling lens 22 and the imaging lens 28 are arranged such that a conjugate image of the light source 21 is formed at infinity and a conjugate image of the light detector 29 is formed in the proximity of the laser radar 20.

Figure 23:
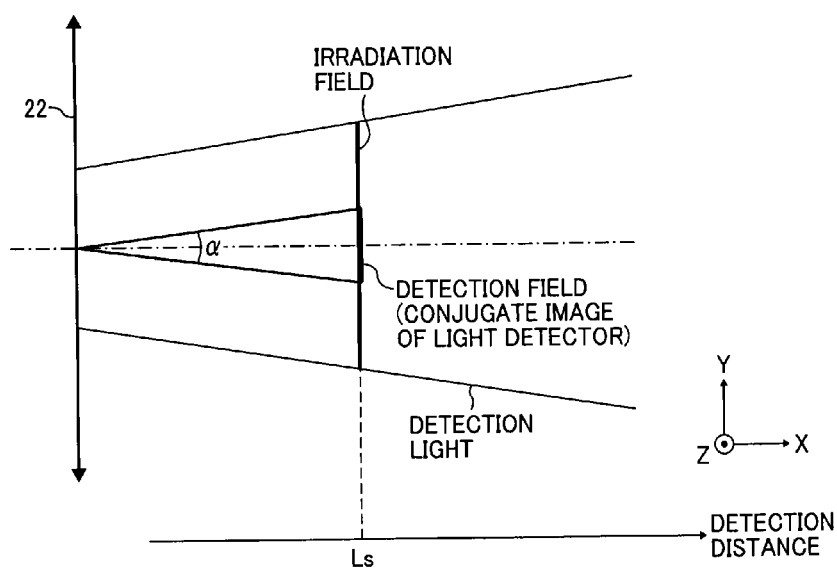
FIG. 23 is a diagram illustrating the relation between an irradiation field and detection field at conjugate points of a light detector in a first example arrangement of an embodiment of the present invention.

FIG. 23 is a diagram illustrating the relation between an irradiation field and detection field at conjugate points of the light detector 29 in the first example arrangement of the present embodiment. For example, as illustrated in FIG. 23, the light reflected from an object can be received by the light detector 29 when the distance between the object and the laser radar 20 in the X-axis direction is at $L_S$ and the object is placed within the conjugate image of the light detector 29 in the Y-axis direction. In this example, the field in which a conjugate image of the light detector 29 is formed is the detection field.

Figure 24:
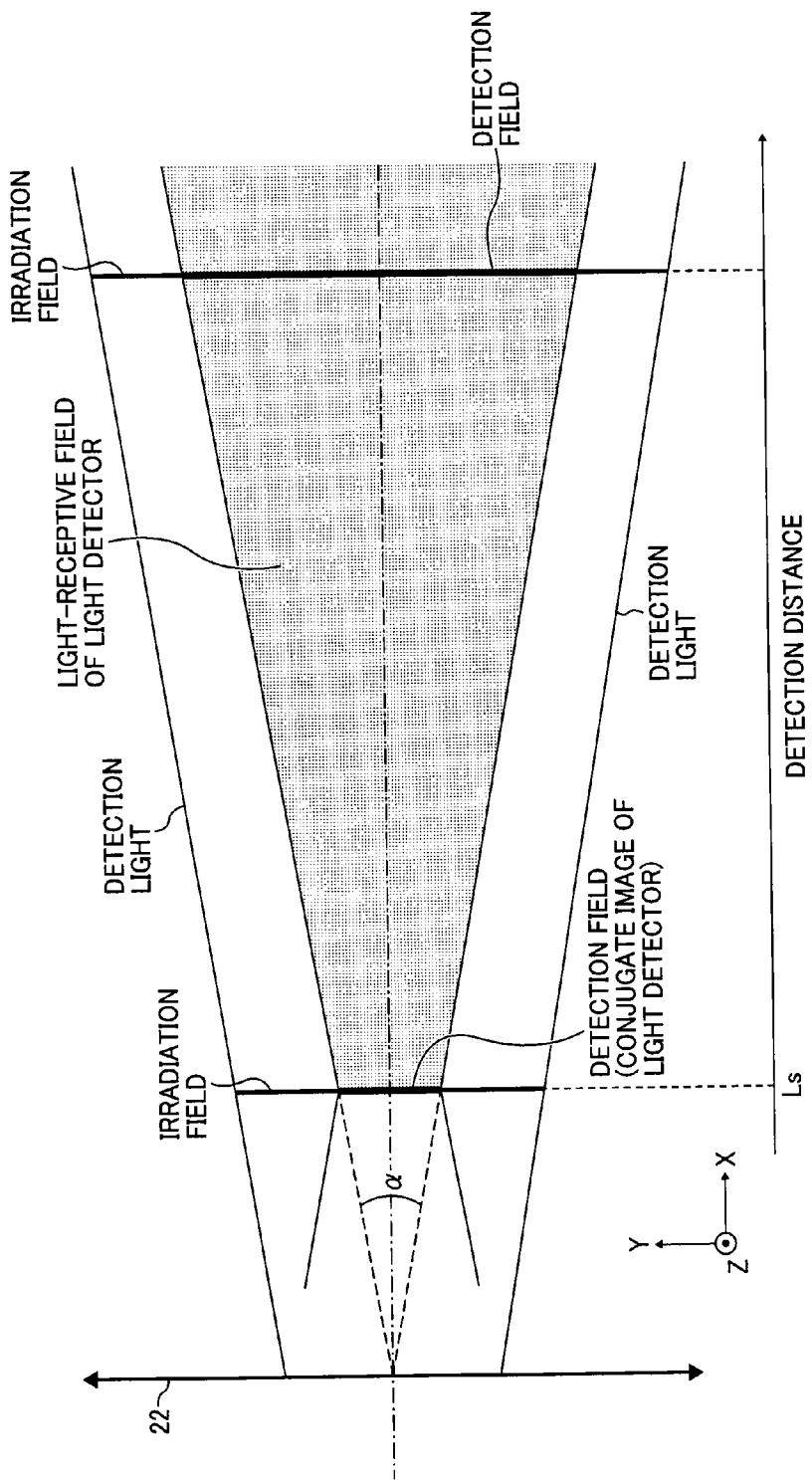
FIG. 24 is a diagram illustrating a detection angle α in a first example arrangement of an embodiment of the present invention.

FIG. 24 is a diagram illustrating a detection angle α in the first example arrangement of the present embodiment. In the present embodiment, the angle of divergence α of the detection field where the center of the coupling lens 22 is the viewpoint is defined to be the detection angle. As illustrated in FIG. 24, the detection angle α is almost constant when the detection distance is equal to or longer than $L_S$. Within the range of the detection distance required for the laser radar 20, the dimension of the detection field is smaller than the dimension of the irradiation area. Accordingly, the resolution of the detection of the laser radar 20 improves compared with the conventional laser radars.

When the detection distance is shorter than $L_S$, the dimension of the detection field becomes larger than the dimension of the detection field when the detection distance is at $L_S$. In other words, the dimension of the detection field becomes the smallest at $L_S$. Accordingly, $L_S$ may be set as a shortest detection distance. In such cases, the object information acquiring processes (e.g., various kinds of computing) at the object information acquisition unit 203 may be simplified.

<Second Example Arrangement of Coupling Lens and Imaging Lens>

Figure 25:
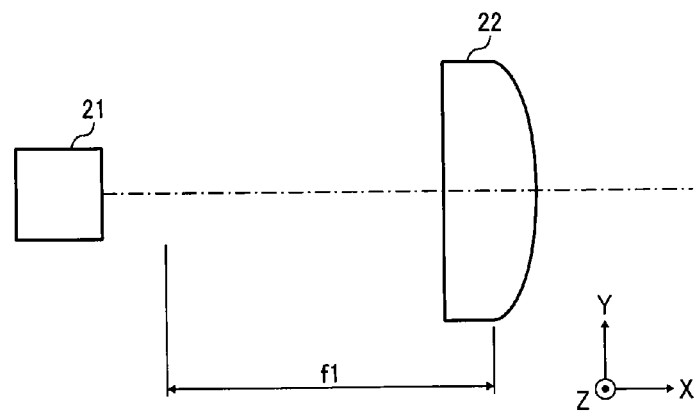
FIG. 25 is a diagram illustrating the relative position of a coupling lens in a second example arrangement of an embodiment of the present invention.

FIG. 25 is a diagram illustrating the relative position of the coupling lens 22 in the second example arrangement of the present embodiment. In the second example arrangement, as illustrated in FIG. 25, the coupling lens 22 is disposed in the X-axis direction such that the distance from the light source 21 becomes greater than the focal length $f_1$ of the coupling lens 22.

Figure 26:
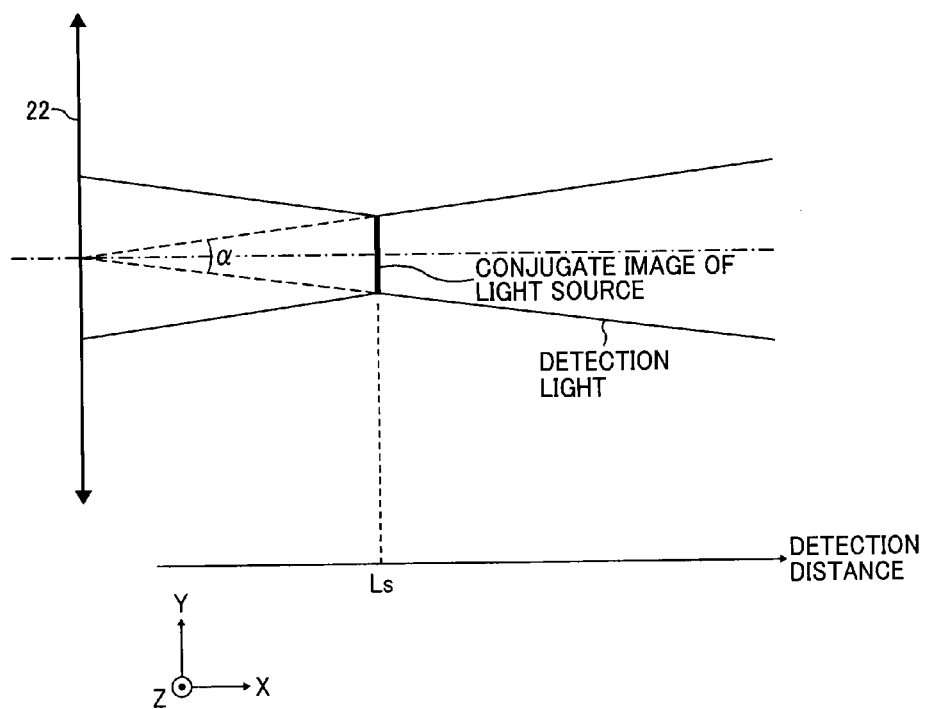
FIG. 26 is a diagram illustrating detection light in a second example arrangement of an embodiment of the present invention.

FIG. 26 is a diagram illustrating detection light in the second example arrangement of the present embodiment. As illustrated in FIG. 26, the coupling lens 22 is arranged such that a conjugate image of the light source 21 is formed by the coupling lens 22 at $L_S$.

Figure 27:
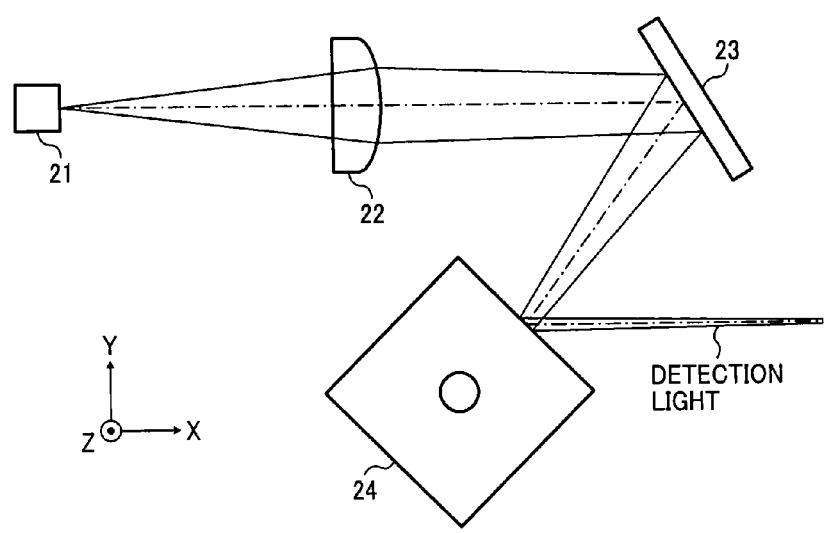
FIG. 27 is a diagram illustrating the optical path of the light emitted from a light emitting area A in a second example arrangement of an embodiment of the present invention.
Figure 28:
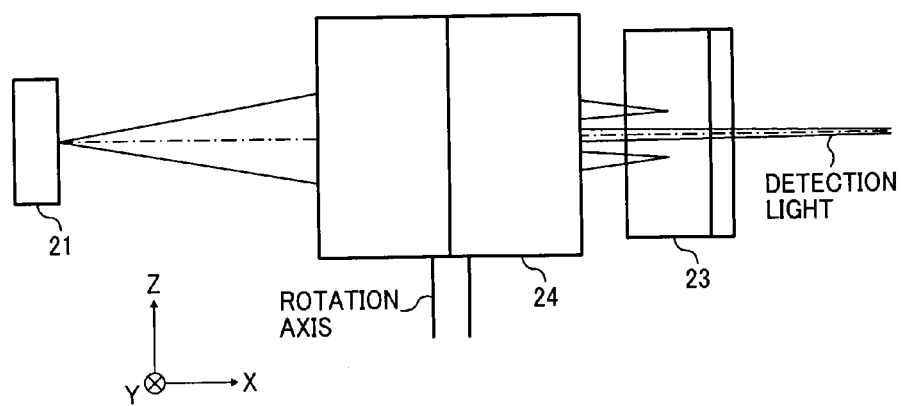
FIG. 28 is another diagram illustrating the optical path of the light emitted from a light emitting area A in a second example arrangement of an embodiment of the present invention.

FIG. 27 and FIG. 28 are diagrams illustrating an example of the optical path of the light emitted from one of the light emitting areas A of the light source 21 in the second example arrangement of the present embodiment.

Figure 29:
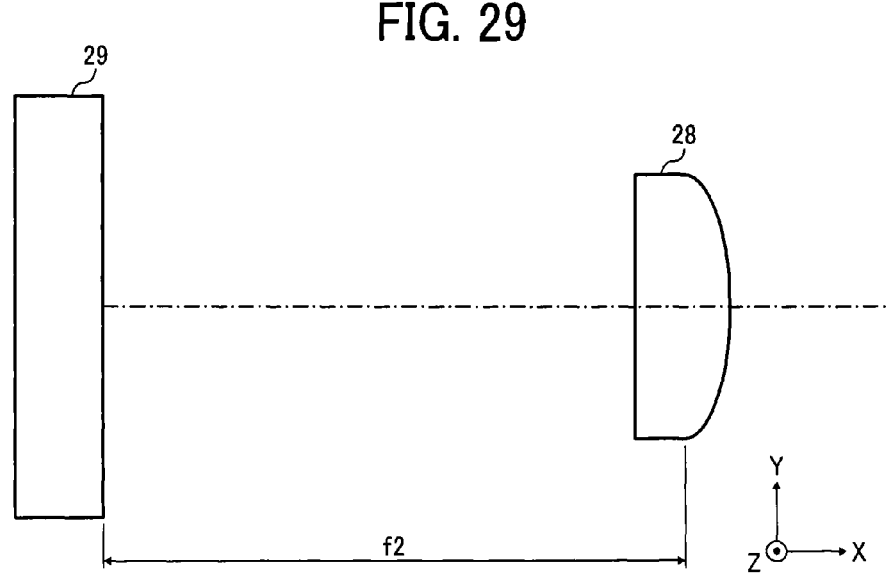
FIG. 29 is a diagram illustrating the relative position of an imaging lens in a second example arrangement of an embodiment of the present invention.

FIG. 29 is a diagram illustrating the relative position of the imaging lens 28 in the second example arrangement of the present embodiment. As illustrated in FIG. 29, the imaging lens 28 is disposed in the X-axis direction such that the distance from the light detector 29 matches the focal length $f_2$ of the imaging lens 28.

Figure 30:
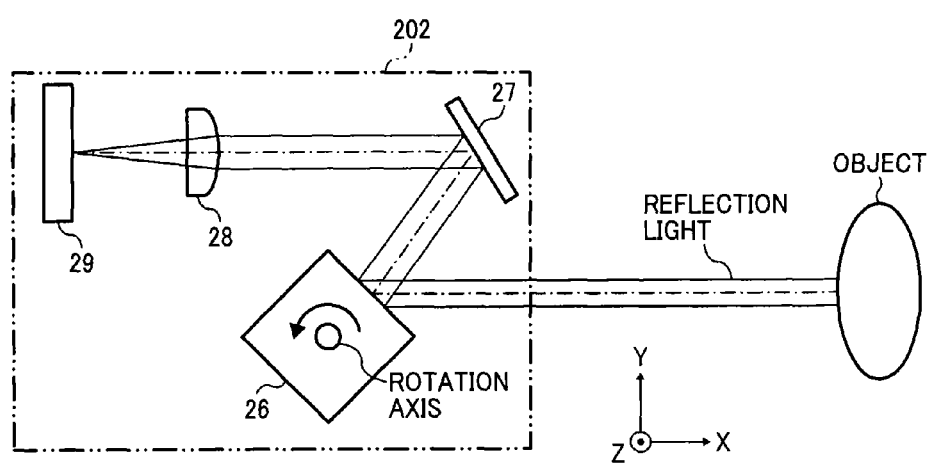
FIG. 30 is a diagram illustrating the optical path of the light reflected from an object in a second example arrangement of an embodiment of the present invention.
Figure 31:
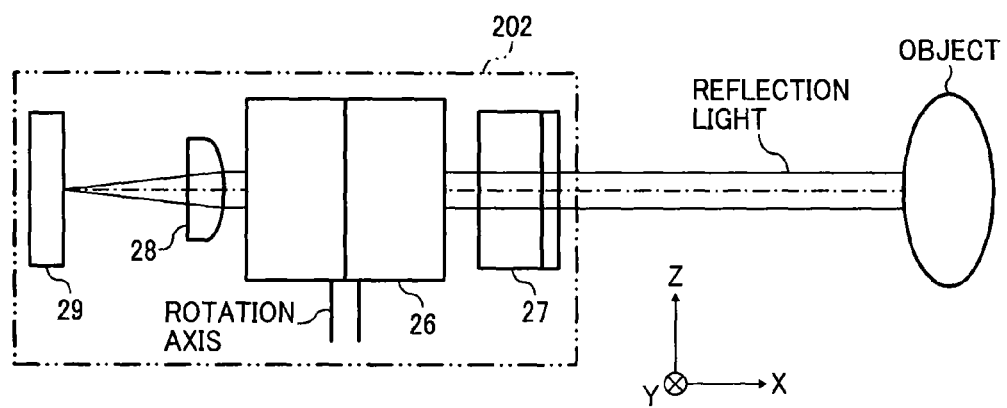
FIG. 31 is another diagram illustrating the optical path of the light reflected from an object in a second example arrangement of an embodiment of the present invention.

FIG. 30 and FIG. 31 are diagrams illustrating an example of the optical path of the light reflected from an object in the second example arrangement of the present embodiment.

In the second example arrangement, the coupling lens 22 and the imaging lens 28 are arranged such that a conjugate image of the light source 21 is formed in the proximity of the laser radar 20 and a conjugate image of the light detector 29 is formed at infinity.

Figure 32:
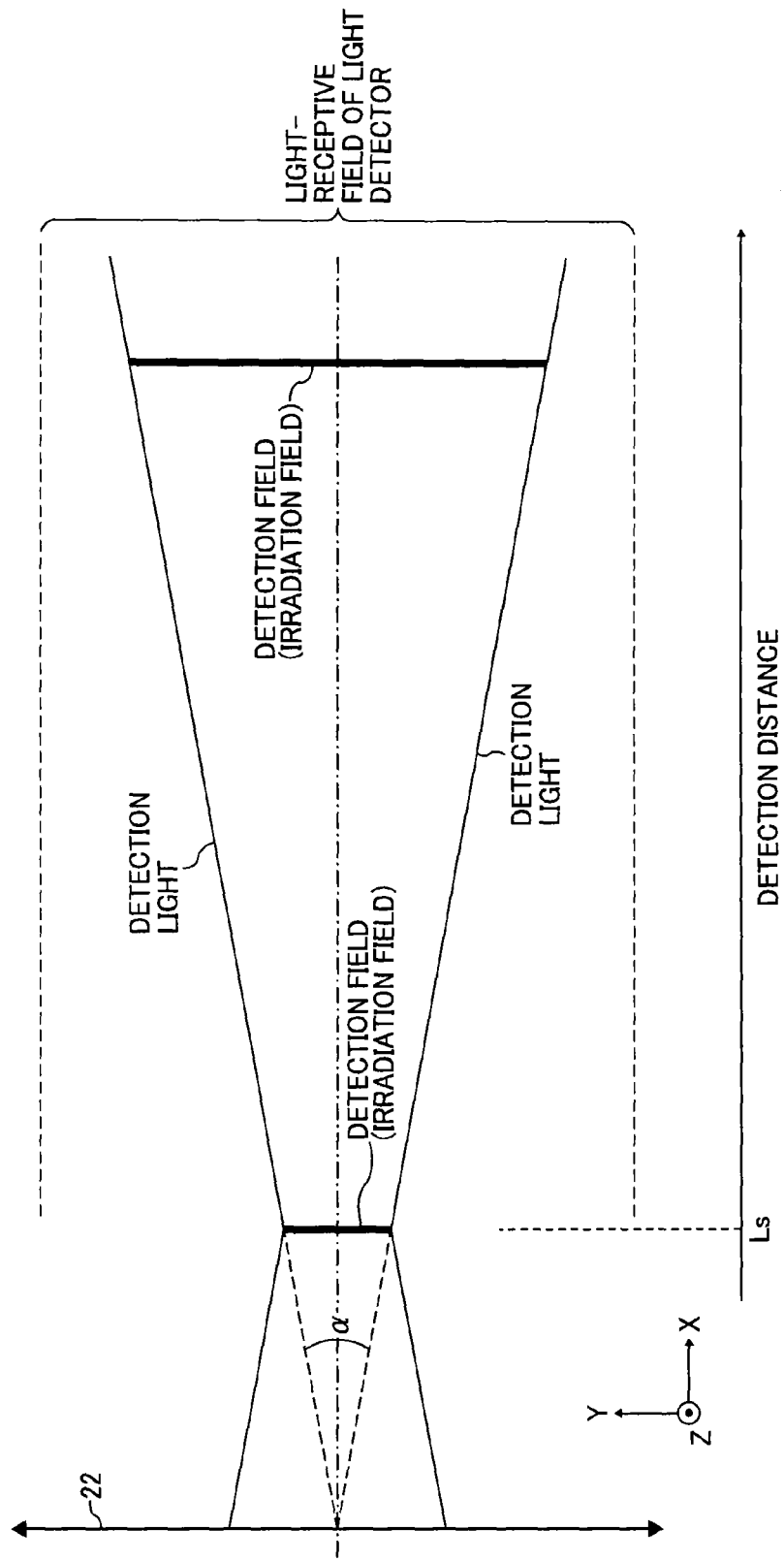
FIG. 32 is a diagram illustrating the relation between detection light and a light-receptive field of a light detector in a second example arrangement of an embodiment of the present invention.

FIG. 32 is a diagram illustrating the relation between detection light and a light-receptive field of the light detector 29 in the second example arrangement of the present embodiment. In the second example arrangement, all the light reflected from an object can be received by the light detector 29. In other words, the irradiation field matches the detection field.

The dimension of the detection field in the second example arrangement is equivalent to the dimension of the detection field first example arrangement. Accordingly, advantageous effects can be achieved in the second example arrangement in a similar manner to the first example arrangement described above.

Note that the field in which an object is detectable is a field where an image of the light source 21 (such an image may be referred to as a light source image in the following description) overlaps with an image of the light detector 29 (such an image may be referred to as a light detector image the following description). Even if an object is placed inside the field of a light source image as in the first example arrangement, the light reflected from an object is not guided to the light detector 29 when the object is outside the light detector image. Accordingly, the object cannot be detected. Moreover, even if an object is placed inside the field of a light detector image as in the second example arrangement, the object is not irradiated with the light emitted from the light source 21 (detection light) when the object is outside the light source image. Accordingly, no light is reflected at the object, and no light is detectable at the light detector 29.

<Example Configuration of Light Source>

In the present example configuration, the light source 21 includes seventy-two light emitting areas A. In the embodiments described above, a hundred light-emitting units are arranged in the Y-axis direction and a hundred light-emitting units are arranged in the Z-axis direction in each of the light emitting areas A. Further, each of the light emitting areas A includes ten-thousand (=100*100) light-emitting units. Moreover, d2, d3, and d4 are about 0.02 m, 0.7 micrometer (μm), and 1 μm (see FIG. 8 and FIG. 9). In such cases, even if the power of the light emission at one light-emitting unit is 1 milliwatt (mW), ten-thousand light-emitting units are integrated to form a single light emitting area A. Accordingly, the power of light emission of 10 watt (W) is achieved.

Figure 33:
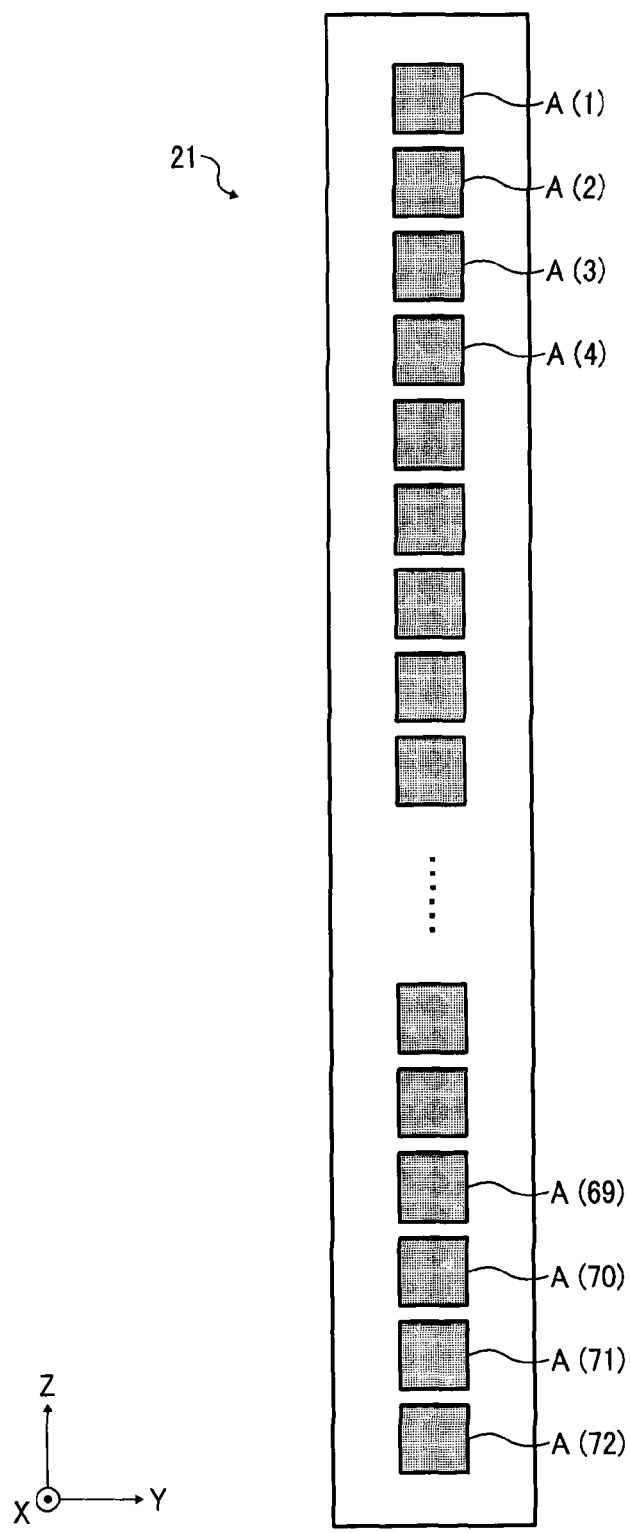
FIG. 33 is a diagram illustrating a plurality of light emitting areas of a light source according to an embodiment of the present invention.

FIG. 33 is a diagram illustrating an example of the configuration of a plurality of light emitting areas of the light source 21 according to the present embodiment. When these seventy-two light emitting areas A are to be distinguished from each other, as illustrated in FIG. 33, each of the light emitting areas A is referred to as A(i) where the order of the light emitting areas A in the −Z direction is indicated by i ($1 \leq i \leq 72$).

Cases (1) in which object information is obtained from an object at a short-distance position, where the detection distance is short, are described below.

In such cases, a sufficient amount of reflection light returns to the light detection system 202 even when the amount of the detection light is small. Typical objects that are to be detected at a short-distance position include children, bikes, motorbikes, curbstones, and small animals, and high resolution is desired in the Z-axis direction when these objects are detected.

Figure 34:
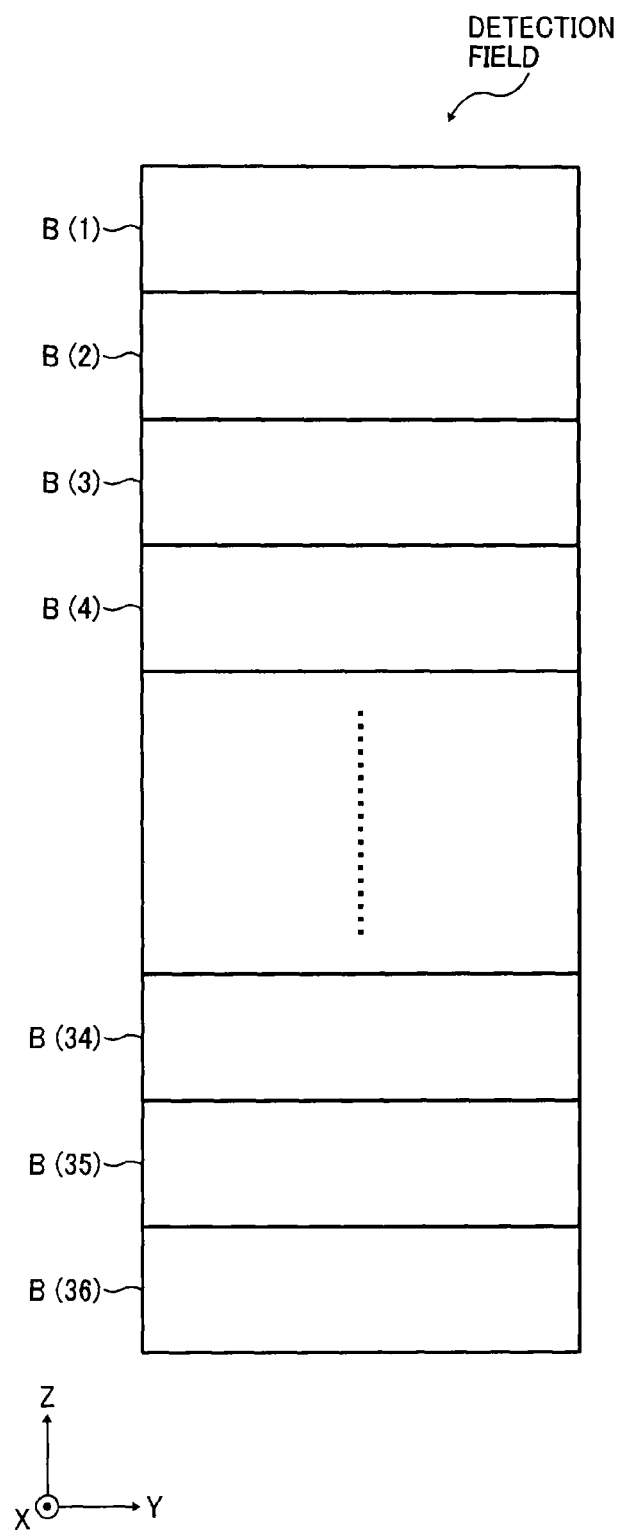
FIG. 34 is a diagram illustrating a first dividing pattern of a detection field according to an embodiment of the present invention.

FIG. 34 is a diagram illustrating a first dividing pattern of a detection field according to the present embodiment. In this first dividing pattern, the detection field is divided into thirty-six subareas B(1) to B(36) in the Z-axis direction, as illustrated in FIG. 34.

Figure 35:
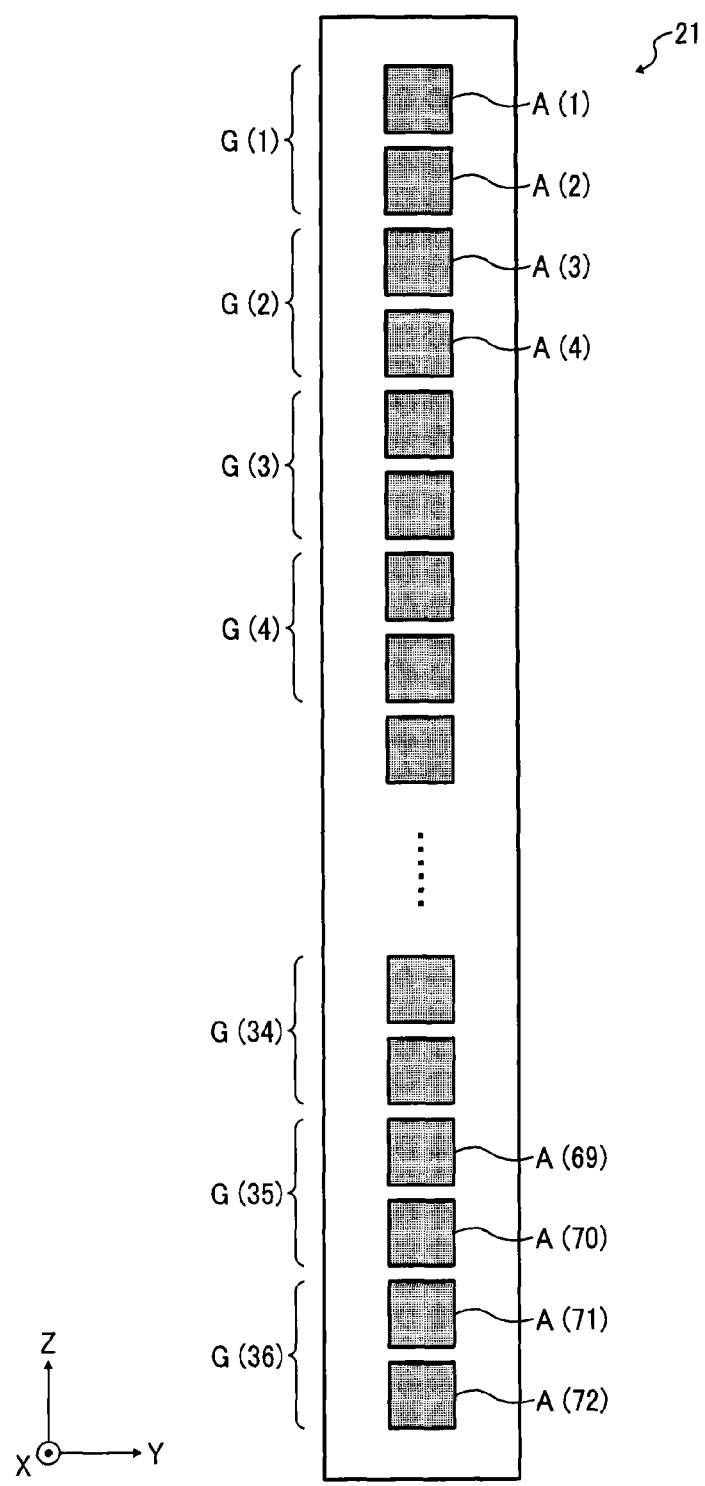
FIG. 35 is a diagram illustrating the grouping of a plurality of light emitting areas of a light source, in a first dividing pattern of an embodiment of the present invention.

FIG. 35 is a diagram illustrating the grouping of a plurality of light emitting areas of a light source, in the first dividing pattern of the present embodiment. As illustrated in FIG. 35, seventy-two light emitting areas are divided into thirty-six groups, where each group includes two light emitting areas. In the first dividing pattern, the group of the light emitting areas A(1) and A(2), the group of the light emitting areas A(3) and A(4), . . . , and the group of the light emitting areas A(71) and A(72) are referred to as a light emission group G(1), a light emission group G(2), . . . , and a light emission group G(36), respectively.

The light emission group G(1) is turned on when object information in the subarea B(1) is to be detected, and the light emission group G(2) is turned on when object information in the subarea B(2) is to be detected. In a similar manner, the light emission group G(36) is turned on when object information in the subarea B(36) is to be detected.

In the first dividing pattern, the amount of the detection light on a single subarea is 20 W (=2*10 W). Note that the amount of light of the detection light on a single subarea in the first dividing pattern will be referred to as $P_S$ in the following description.

Accordingly, the amount of the detection light on a subarea can be increased without increasing the amount of the light at each one of the light emitting areas A.

Cases (2) in which object information is obtained from an object at a long-distance position, where the detection distance is long, are described below.

In such cases, a sufficient amount of reflection light does not return to the light detection system 202 when the amount of the detection light is small. The amount of the reflection light is inversely proportional to the square of the distance. Accordingly, assuming that the short-distance position and the long-distance position are $L_S$ and $L_L$, respectively, the amount of the light reflected from an object at a long-distance position is obtained by "$P_S*(L_S/L_L)^2$" when the amount of the light emitted from the light emission system 201 is the same and the reflectivity of an object is the same.

The level of the light-receptive sensitivity of the light detector 29 remains the same regardless of whether the detection distance is at a short-distance position or long-distance position. Accordingly, in order to achieve, when the detection distance is at a long-distance position, the accuracy of detection that is about the same as that of when the detection distance is at a short-distance position, it is desired that the amount of the reflection light from a long-distance position be about the same as the amount of the reflection light from a short-distance position. For example, when $L_S$=80 m and $L_L$=240 m, it is desired that the amount of the detection light be nine times greater than that of when the detection distance is at a short-distance position ($=(240/80)^2$) when an object at a long-distance position is to be detected.

Typical objects that are to be detected at a long-distance position include bikes or motorbikes that are travelling ahead of the vehicle, and the resolution in the Z-axis direction when these objects are detected may be low.

Figure 36:
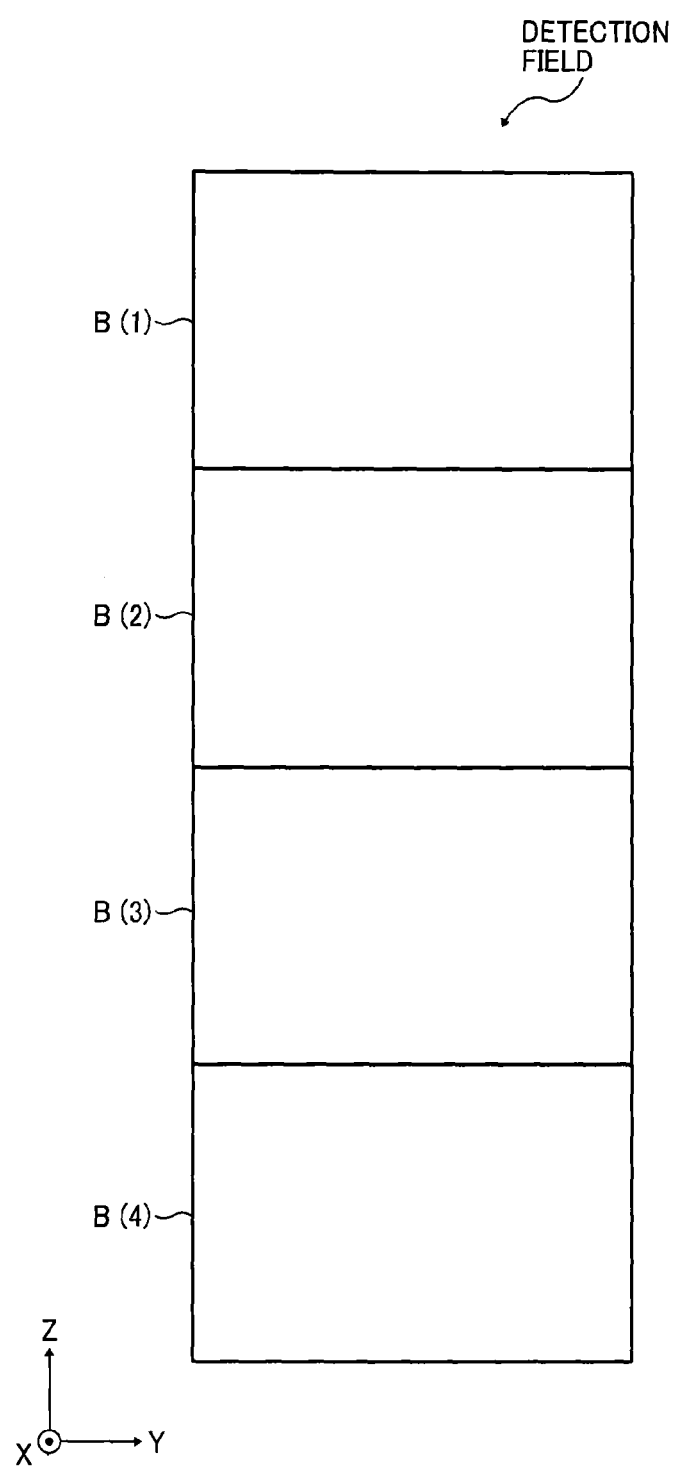
FIG. 36 is a diagram illustrating a second dividing pattern of a detection field according to an embodiment of the present invention.

FIG. 36 is a diagram illustrating a second dividing pattern of a detection field according to the present embodiment. In this second dividing pattern, the detection field is divided into four subareas B(1) to B(4) in the Z-axis direction, as illustrated in FIG. 36.

Figure 37:
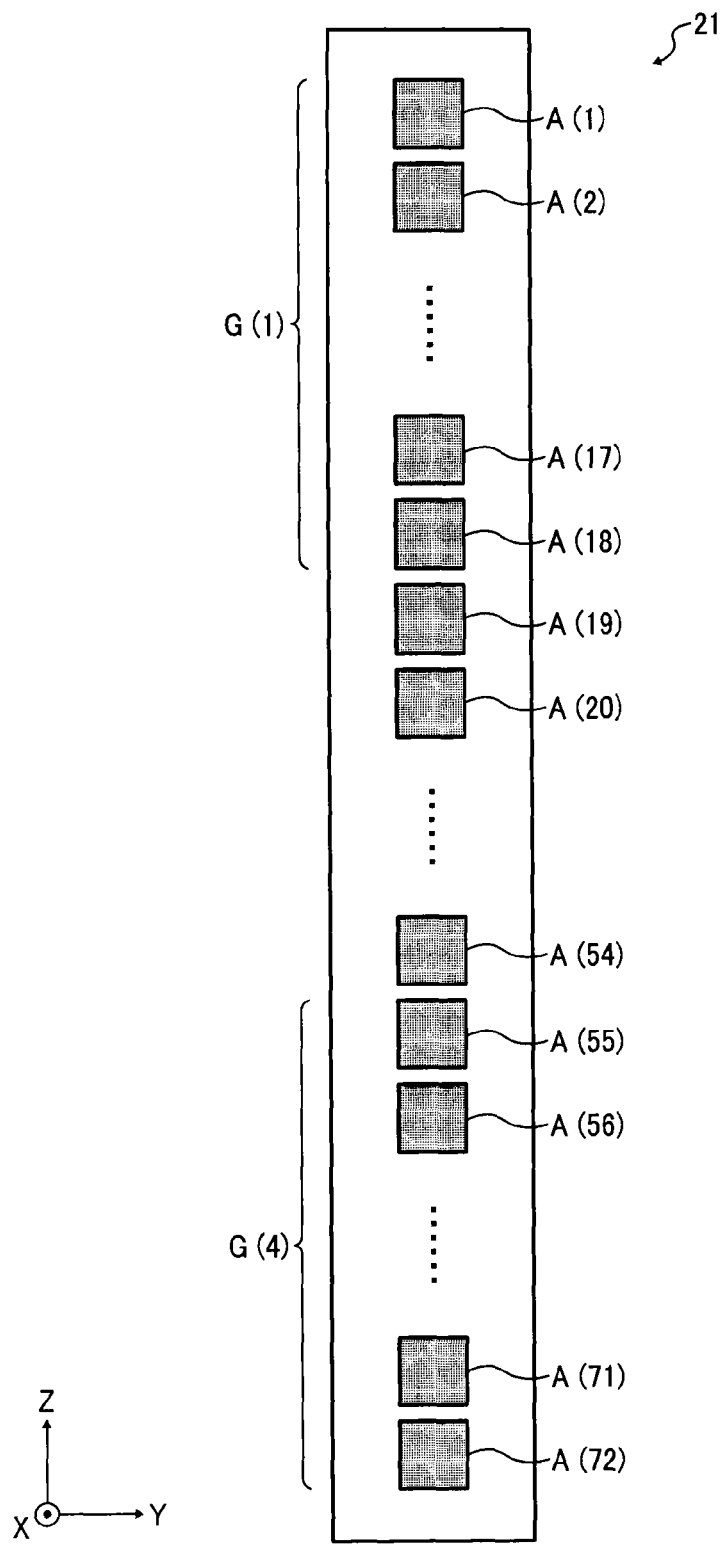
FIG. 37 is a diagram illustrating the grouping of a plurality of light emitting areas of a light source, in a second dividing pattern of an embodiment of the present invention.

FIG. 37 is a diagram illustrating the grouping of a plurality of light emitting areas of a light source, in the second dividing pattern of the present embodiment. As illustrated in FIG. 37, seventy-two light emitting areas are divided into four groups, where each group includes eighteen light emitting areas. In the second dividing pattern, the group of the light emitting areas A(1) to A(18), the group of the light emitting areas A(19) and A(36), the group of the light emitting areas A(37) to A(54), and the group of the light emitting areas A(55) to A(72) are referred to as a light emission group G(1), a light emission group G(2), a light emission group G(3), and a light emission group G(4), respectively.

The light emission group G(1) is turned on when object information in the subarea B(1) is to be detected, and the light emission group G(2) is turned on when object information in the subarea B(2) is to be detected. In a similar manner, the light emission group G(3) is turned on when object information in the subarea B(3) is to be detected, and the light emission group G(4) is turned on when object information in the subarea B(4) is to be detected.

In the second dividing pattern, the amount of the detection light on a single subarea is 180 W (=18*10 W). Note that the amount of light of the detection light on a single subarea in the second dividing pattern will be referred to as $P_L$ in the following description.

Accordingly, the amount of the detection light on a subarea can be increased without increasing the amount of the light at each one of the light emitting areas A.

When an object at a short-distance position is to be detected, cases in which the reflectivity of the object is small need to be considered compared with when an object at a long-distance position is to be detected.

Cases (3) in which object information is obtained from an object at a short-distance position with small reflectivity are described below.

Figure 38:
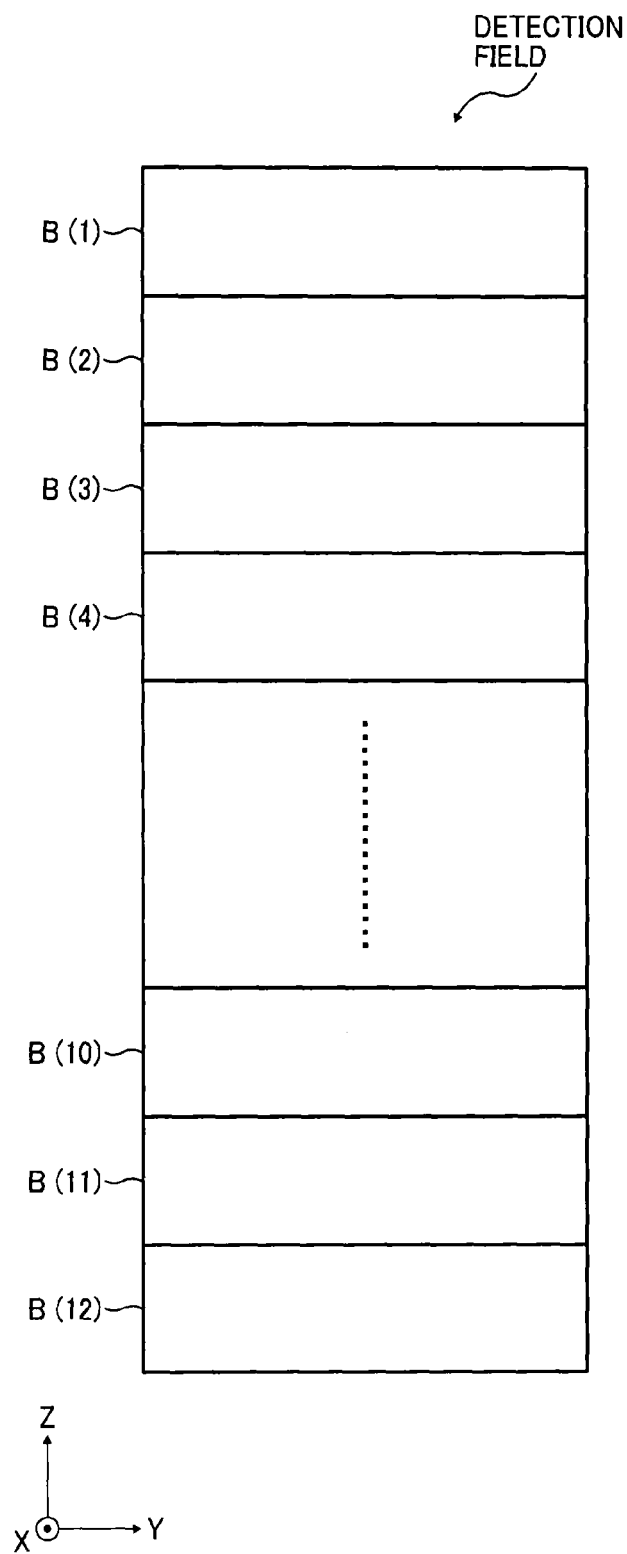
FIG. 38 is a diagram illustrating a third dividing pattern of a detection field according to an embodiment of the present invention.

FIG. 38 is a diagram illustrating a third dividing pattern of a detection field according to the present embodiment. In this third dividing pattern, the detection field is divided into twelve subareas B(1) to B(12) in the Z-axis direction, as illustrated in FIG. 38.

Figure 39:
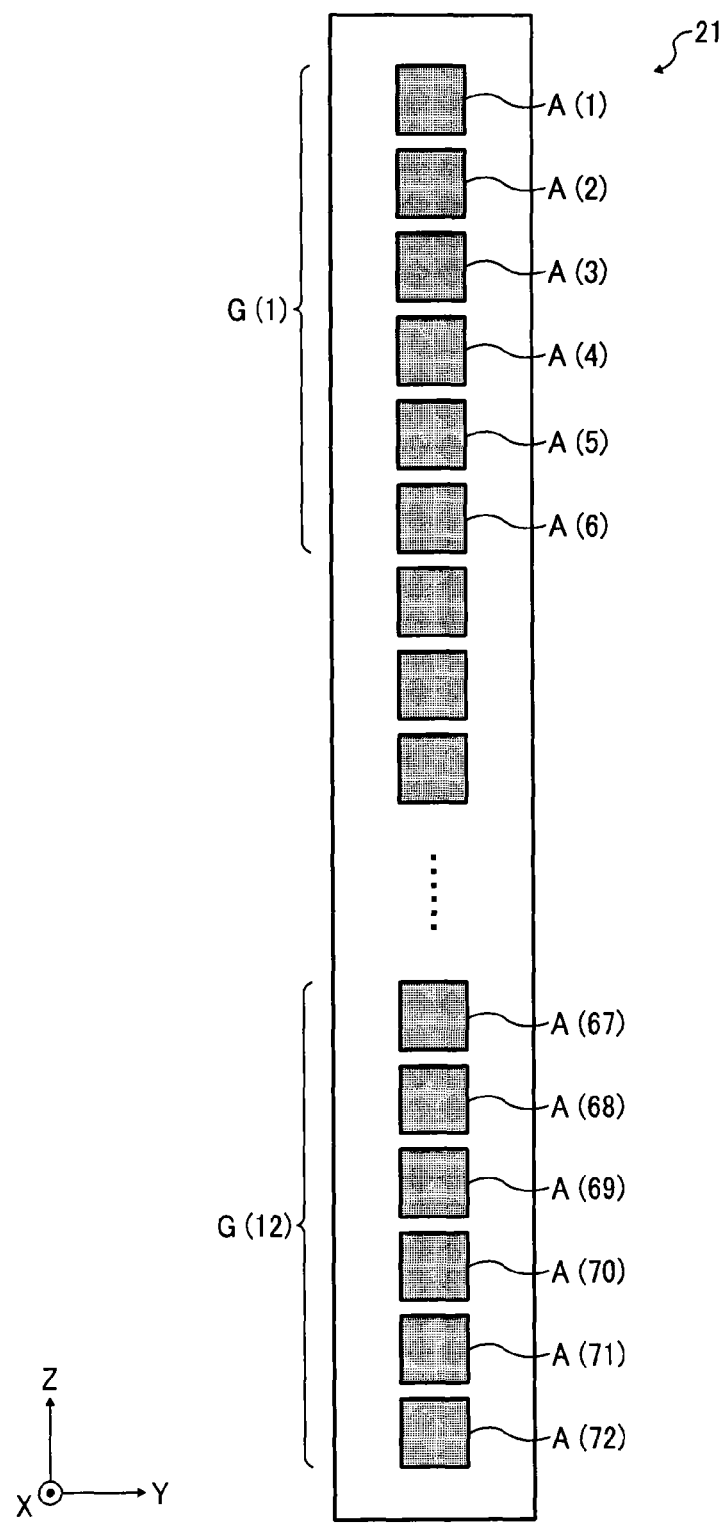
FIG. 39 is a diagram illustrating the grouping of a plurality of light emitting areas of a light source, in a third dividing pattern of an embodiment of the present invention.

FIG. 39 is a diagram illustrating the grouping of a plurality of light emitting areas of a light source, in the third dividing pattern of the present embodiment. As illustrated in FIG. 39, seventy-two light emitting areas may be divided into twelve groups, where each group includes six light emitting areas. In the third dividing pattern, the group of the light emitting areas A(1) to A(6), the group of the light emitting areas A(7) to A(12), . . . , and the group of the light emitting areas A(67) to A(72) are referred to as a light emission group G(1), a light emission group G(2), . . . , and a light emission group G(12), respectively.

The light emission group G(1) is turned on when object information in the subarea B(1) is to be detected, and the light emission group G(2) is turned on when object information in the subarea B(2) is to be detected. In a similar manner, the light emission group G(12) is turned on when object information in the subarea B(12) is to be detected.

In the third dividing pattern, the amount of the detection light on a single subarea is 60 W (=6*10 W). Accordingly, the accuracy of detection can be improved even when the reflectivity of an object at a short-distance position is smaller than the reflectivity of an object at a long-distance position.

As described above, a detection field is divided into a plurality of subareas in the Z-axis direction in the present embodiment. Moreover, the number of the partitions of the number of the partitions of the detection field is variable depending on the detection distance in the present embodiment.

Assuming that the amount of the light emitted from the light emission system 201 when the number of the partitions of the detection field is $N_S$ is $P_S$ and the amount of the light emitted from the light emission system 201 when the number of the partitions of the detection field is $N_L(<N_S)$ is $P_L$, the object information acquisition unit 203 selects light emitting areas to be turned on from the multiple light emitting areas such that the relation of "$P_S<P_L$" is satisfied. As described above, $P_S$=20 W, $P_L$=180 W, and $P_S$=60 W, in the first dividing pattern (1), the second dividing pattern (2), and the third dividing pattern (3), respectively, where the relation of $P_S<P_L$ is satisfied.

Assuming that the number of the light emitting areas of the light source 21, the amount of the light emitted from a single light emitting area, and k are j, w, and a natural number equal to or greater than 1, "$j=K*N_S$" and "$P_S=K*w$" are satisfied when the number of the partitions of the detection field is $N_S$. In the first dividing pattern (1), j=72, $N_S$=36, k=2, and w=10, and "$P_S=K*w$" is satisfied. In the third dividing pattern (3), j=72, $N_S$=12, k=6, and w=10, and "$P_S=K*w$" is satisfied.

Assuming that m is a natural number greater than k, "$j=m*N_L$" and "$P_L=m*w$" are satisfied when the number of the partitions of the detection field is $N_L$. In the second dividing pattern (2), j=72, $N_L$=4, m=18(>k), and w=10, and "$P_L=m*w$" is satisfied.

Assuming that the detection distance when the number of partitions of the detection field is Ns is $L_S$ and the detection distance when the number of partitions of the detection field is $N_L$ is $L_L$, "m/k" becomes a natural number that is closest to "$(L_L/L_S)^2$". In the second dividing pattern (2), $(L_L/L_S)^2$=9 when $L_S$=80 m and $L_L$=240 m. In the first dividing pattern (1) and the second dividing pattern (2), k=2 and m=18, and thus the condition that m/k is a natural number that is closest to "$(L_L/L_S)^2$" is satisfied.

For the purposes of simplification, detection of an object at a short-distance position is referred to as short-distance detection, and detection of an object at a long-distance position is referred to as long-distance detection in the following description.

Figure 40:
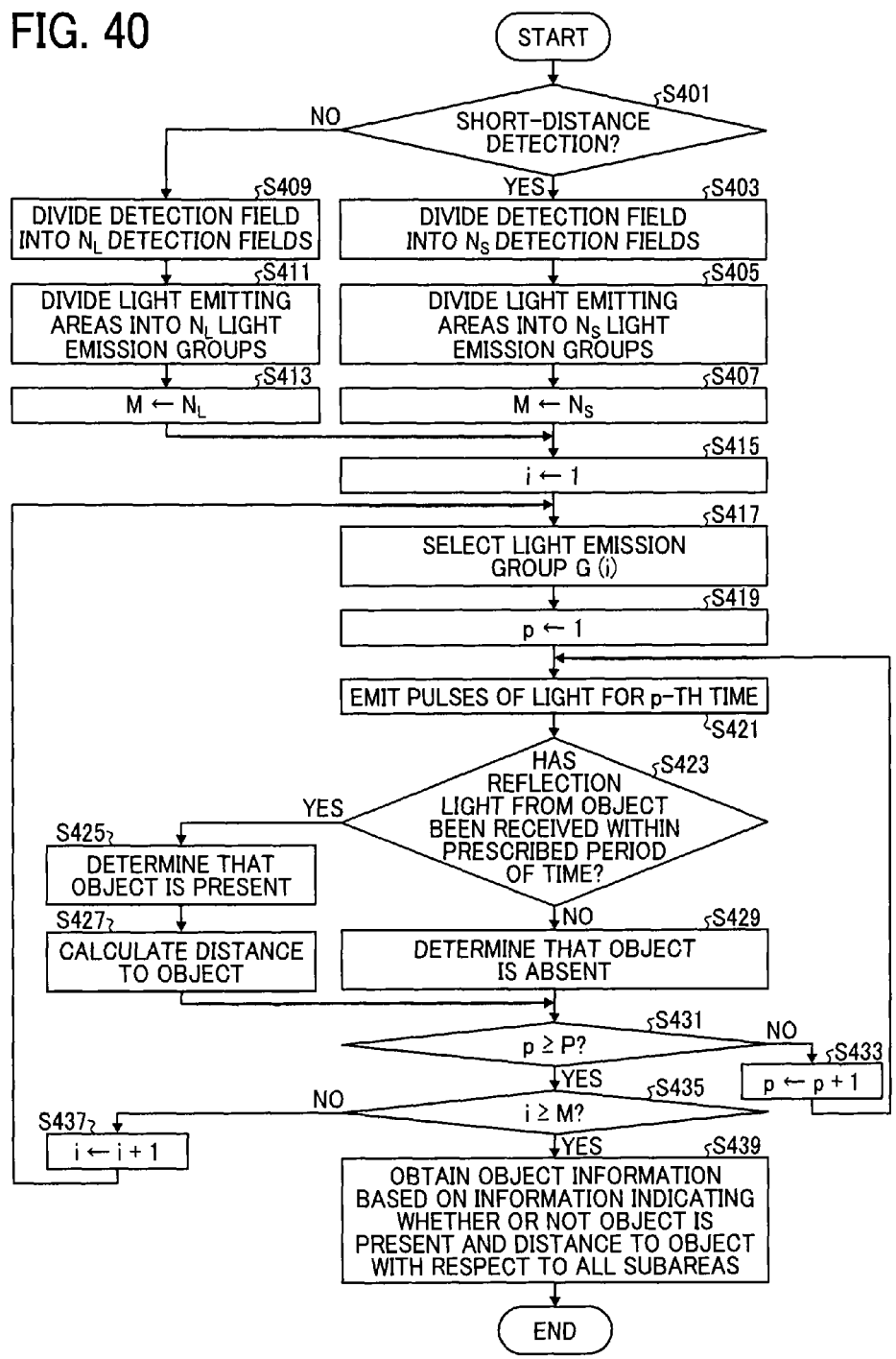
FIG. 40 is a flowchart of the processes performed by an object information acquisition unit, according to an embodiment of the present invention.

FIG. 40 is a flowchart of the object information acquisition processes performed by the object information acquisition unit 203 according to the present embodiment. The object information acquisition unit 203 repeats performing these object information acquisition processes at prescribed time intervals (for example, for every 21 millisecond (ms)) until the power is switched off.

In the present embodiment, it is assumed that the number of the light emission groups in short-distance detection is $N_S$ and the number of the light emission groups in long-distance detection is $N_L$. Moreover, it is assumed that the light source 21 emits pulses of light for P times in a single scanning.

In the first step S401, whether or not the detection is short-distance detection is determined. When the speed of a vehicle 1 is equal to or lower than a prescribed threshold, the determination in step S401 is affirmed and the process shifts to step S403.

In step S403, the detection field is divided into $N_S$ detection fields in the Z-axis direction. In the following step S405, a plurality of light emitting areas are divided into $N_S$ light emission groups. In the following step S407, $N_S$ is set to a constant M that indicates the number of repeats. Then, the process shifts to step S415.

On the other hand, when the speed of the vehicle 1 is higher than the prescribed threshold, the determination in step S401 is denied and the process shifts to step S409. In the step S409, the detection field is divided into $N_L$ detection fields in the Z-axis direction.

In the following step S411, a plurality of light emitting areas are divided into $N_L$ light emission groups. In the following step S413, $N_L$ is set to a constant M that indicates the number of repeats. Then, the process shifts to step S415. In the following step S415, the initial value "1" is changed to a variable i that specifies a light emission group.

In the following step S417, a light emission group G(i) is selected. In the following step S419, the initial value "1" is changed to a variable p that indicates the number of times the pulse light emission has been performed so far in a single scanning. In the following step S421, the light source 21 is instructed to emit p-th pulse of light of the light emission group G(i).

In the subsequent step S423, whether or not any light reflected from an object has been received within a prescribed period of time is determined. When light reflected from an object has been received within a prescribed period of time, the determination in step S423 is affirmed, and the process shifts to step S425. In the present embodiment, prescribed period of time is 2 microsecond (μs). However, no limitation is intended thereby. In step S425, it is determined that an object is present.

In the following step S427, the distance to the object is calculated based on the timing of light emission at the light source 21 and the timing of light reception at the light detector 29. Then, the distance to the object calculated in the step S427 is stored in the memory of the object information acquisition unit 203 together with the object presence information of an object, the detection time, and the values of the variable i and p. Then, the process shifts to step S431.

When reflection light from an object is not received within a prescribed period of time in the above step S423, the determination in step S423 is denied, and the process shifts to step S429.

In step S429, it is determined that an object is absent. Then, the object absence information is stored in the memory of the object information acquisition unit 203 together with the detection time, and the values of the variable i and p. Then, the process shifts to step S431.

In the next step S431, whether or not the variable p is equal to or greater than P is determined. When the variable p is smaller than P, the determination is step S431 is denied, and the process shifts to step S433. In step S433, the variable p is increased by 1 (+1), and the process returns to the above step S421.

The processes in steps S421 to S433 are repeated until the determination in step S431 becomes positive.

When the value of the variable p becomes equal to or greater than P, the determination in step S431 is affirmed and the process shifts to step S435.

In the step S435, whether or not the variable i is equal to or greater than a constant M is determined. When the variable i is smaller than the constant M, the determination is step S435 is denied, and the process shifts to step S437. In the step S437, the variable i is increased by 1 (+1), and the process returns to the above step S417.

Afterward, the processes in steps S417 to S437 are repeated until the determination in step S435 becomes positive.

When the value of the variable i becomes equal to or greater than the constant M, the determination in the above step S435 is affirmed and the process shifts to step S439.

In the step S439, the information indicating whether or not an object is present and the distance to the object with respect to all of the detection field are read from a memory of the object information acquisition unit 203. When an object is present, object information such as the position, dimension, and shape of the object are obtained based on the distance to the object for each light emitting direction. Then, the object information that is obtained in the step S439 is stored in the memory 50 together with the detection time. After that, the object information acquisition process terminates.

As illustrated in FIG. 2, when there is an object ahead of the vehicle 1, the main controller 40 determines whether or not the object has moved based on the object information stored in the memory 50, at prescribed time intervals, and obtains the movement information of the object such as the moving direction and moving speed of the object when it is determined that the object has moved. Then, the main controller 40 displays the object information and the movement information on the display 30.

Moreover, the main controller 40 determines whether or not there is danger based on the object information and the movement information. When the main controller 40 determines that there is danger, the main controller 40 outputs alarm information to the voice and alarm generator 60.

Figure 41:
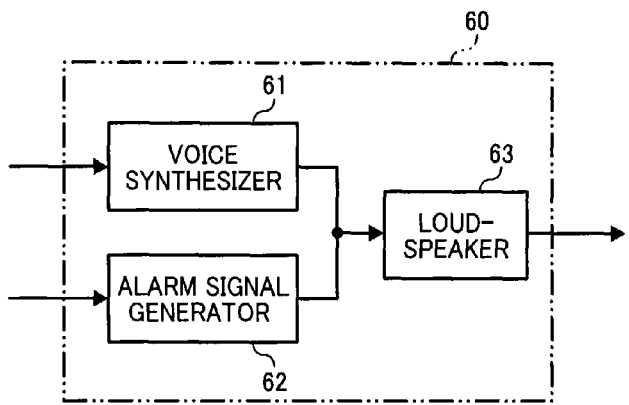
FIG. 41 is a block diagram illustrating the configuration of a voice and alarm generator according to an embodiment of the present invention.

FIG. 41 is a block diagram illustrating the configuration of the voice and alarm generator 60 according to the present embodiment. As illustrated in FIG. 41, the voice and alarm generator 60 includes, for example, a voice synthesizer 61, an alarm signal generator 62, and a loudspeaker 63.

The voice synthesizer 61 has a plurality of pieces of voice data, and when the alarm information is received from the main controller 40, the voice synthesizer 61 selects the corresponding piece of voice data and outputs the selected piece of voice data to the loudspeaker 63.

When the alarm information is received from the main controller 40, the alarm signal generator 62 generates the corresponding alarm signal and outputs the selected alarm signal to the loudspeaker 63.

As described above, the controller and processor of the object detector according to an embodiment of the present invention are configured by the object information acquisition unit 203 according to the present the present embodiment. The monitoring controller of the sensing apparatus according to an embodiment of the present invention is configured by the main controller 40, the memory 50, and the voice and alarm generator 60. For example, the controller or the processor may be implemented by one or more processing circuits or circuitry, such as a programmed processor, an application specific integrated circuit (ASIC), etc.

As described above, the laser radar 20 according to the present embodiment includes, for example, the light emission system 201, the light detection system 202, and the object information acquisition unit 203.

The light emission system 201 includes, for example, the light source 21, the coupling lens 22, the first reflecting mirror 23, and the first rotating mirror 24. The light detection system 202 includes, for example, the second rotating mirror 26, the second reflecting mirror 27, the imaging lens 28, and the light detector 29.

As illustrated in FIG. 8 for example, the light source 21 includes a plurality of light emitting areas that are arranged in the Z-axis direction at regular intervals. Further, each of the light emitting areas includes a plurality of two-dimensionally arranged light-emitting units.

When a detection field is divided into a plurality of subareas in the Z-axis direction by the object information acquisition unit 203, the number of partitions (subareas) is variable.

Assuming that the amount of the light emitted from the light emission system 201 when the number of the partitions of the detection field is $N_S$ is $P_S$ and the amount of the light emitted from the light emission system 201 when the number of the partitions of the detection field is $N_L(<N_S)$ is $P_L$, the object information acquisition unit 203 selects light emitting areas to be turned on from the multiple light emitting areas such that the relation of "$P_S<P_L$" is satisfied.

Assuming that the number of the light emitting areas of the light source 21, the amount of the light emitted from a single light emitting area, and k are j, w, and a natural number equal to or greater than 1, "$j=K*N_S$" and "$P_S=K*w$" are satisfied when the number of the partitions of the detection field is $N_S$.

Assuming that m is a natural number greater than k, "$j=m*N_L$" and "$P_L=m*w$" are satisfied when the number of the partitions of the detection field is $N_L$.

Assuming that the detection distance when the number of the partitions of the detection field is $N_S$ is $L_S$ and the detection distance when the number of partitions of the detection field is $N_L$ is $L_L$, "m/k" becomes a natural number that is closest to "$(L_L/L_S)^2$".

According to the embodiments described above, both improvement in the resolution of detection in the Z-axis direction and enhancement of the longevity of a light source in the laser radar 20 can be achieved.

The object information acquisition unit 203 calculates the distance to the object, based on the timing of light emission at the light source 21 and the timing of light reception at the light detector 29. Further, the object information acquisition unit 203 acquires object information based on the calculated distance to the object. Accordingly, object information can accurately be acquired.

With the monitoring apparatus 10 according to the present embodiment, the provision of the laser radar 20 enables accurate acquisition of the object information and movement information. Accordingly, the monitoring precision improves.

In the embodiments described above, cases in which the light emission system 201 is disposed on the +Z side of the light detection system 202 are described. However, no limitation is indicated thereby.

In the embodiments described above, cases in which the light emitting areas are square-shaped are described. However, no limitation is indicated thereby.

In the embodiments described above, cases in which the light-emitting units are square-shaped are described. However, no limitation is indicated thereby.

In the embodiments described above, cases in which each of the first rotating mirror 24 and the second rotating mirror 26 has four specular surfaces are described. However, no limitation is indicated thereby.

In the embodiments described above, a rotation mechanism that rotates the laser radar 20 about the Z axis may further be provided.

In the embodiments described above, the relative positions of the coupling lens 22 and the imaging lens 28 are not limited to the first example arrangement and the second example arrangement.

In the embodiments described above, cases in which the light source 21 includes seventy-two light emitting areas are described. However, no limitation is indicated thereby. The number of the light emitting areas may be determined according to the desired dimension of the detection field in the Z-axis direction.

In the embodiments described above, cases in which a hundred light-emitting units are arranged in the Y-axis direction and a hundred light-emitting units are arranged in the Z-axis direction in each of the light emitting areas are described. However, no limitation is indicated thereby.

In the embodiments described above, cases in which the number of the light-emitting units in the Y-axis direction is equal to the number of the light-emitting units in the Z-axis direction in each of the light emitting areas are described. However, no limitation is indicated thereby.

In the embodiments described above, cases in which a plurality of light-emitting units are two-dimensionally arranged in each of the light emitting areas are described. However, no limitation is intended thereby. For example, a plurality of light-emitting units may be arranged in a one-dimensional manner.

In the embodiments described above, cases in which $d_2$, $d_3$, and $d_4$ are about 0.02 mm, 0.7 micrometer (μm), and 1 μm, respectively, are described. However, no limitation is indicated thereby.

In the embodiments described above, the focal length $f_1$ of the coupling lens 22 may be equal to the focal length $f_2$ of the imaging lens 28. In such cases, the coupling lens 22 and the imaging lens 28 may be used in common, and the cost can be reduced.

In the embodiments described above, the main controller 40 may perform some of the processes of the object information acquisition unit 203, and the object information acquisition unit 203 may perform some of the processes of the main controller 40.

Figure 42:
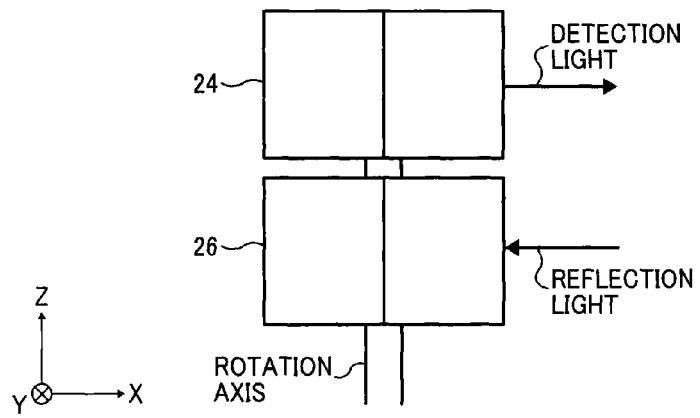
FIG. 42 is a diagram illustrating a first example of the integration of a first rotating mirror and a second rotating mirror, according to an embodiment of the present invention.
Figure 43:
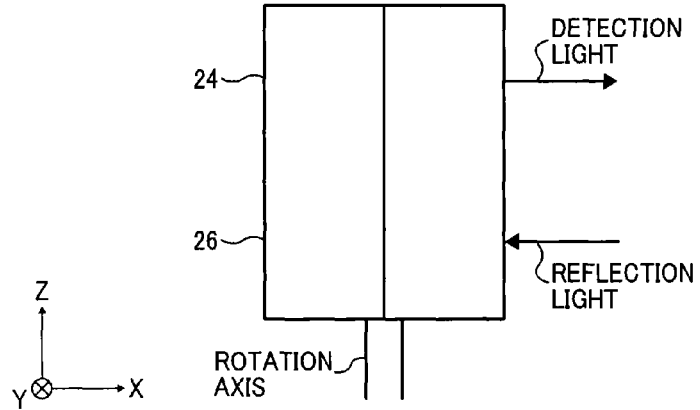
FIG. 43 is a diagram illustrating a second example of the integration of a first rotating mirror and a second rotating mirror, according to an embodiment of the present invention.

FIG. 42 and FIG. 43 are diagrams illustrating first and second examples of the integration of the first rotating mirror 24 and the second rotating mirror 26, according to the present embodiment. In the embodiments described above, the first rotating mirror 24 and the second rotating mirror 26 may be integrated with each other as illustrated in FIG. 42 and FIG. 43.

In the embodiments described above, cases in which the monitoring apparatus 10 includes a single laser radar 20 are described. However, no limitation is indicated thereby. For example, the monitoring apparatus 10 may include a plurality of laser radars 20 according to the size of a vehicle or the monitoring area.

In the embodiments described above, cases in which the laser radar 20 is provided for the monitoring apparatus 10 that monitors the view in the traveling direction of the vehicle are described. However, no limitation is indicated thereby. For example, the laser radar 20 may be provided for an apparatus that monitors the rear view or side view of the vehicle.

The laser radar 20 may be provided for any device or apparatus other than vehicles to serve as a sensing apparatus. In such cases, the main controller 40 outputs alarm information that meets the purposes of the sensing.

The laser radar 20 may be used only for detecting the presence or absence of an object.

In particular, the laser radar 20 may be used, for example, for rangefinders or shape measuring apparatuses that are different from sensing apparatuses.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. An object detector, comprising:
    a light emitter including at least a light source having a plurality of light emitting areas disposed along a first direction to emit light;
    an optical scanner configured to scan the light emitted from the light emitter along a second direction that is different from the first direction;
    a light receiver configured to receive the light which is output from the optical scanner and then reflected at an object; and
    a controller configured to divide a detection field into a plurality of subareas in a third direction that is orthogonal to the second direction,
    wherein a number of partitions of the detection field is variable.

2. The object detector according to claim 1, wherein the controller is further configured to select light emitting areas to be turned on, from the plurality of light emitting areas, such that a relation of "$P_S<P_L$" is satisfied, where Ps denotes an amount of the light emitted from the light emitter when the number of partitions is $N_S$, and $P_L$ denotes an amount of the light emitted from the light emitter when the number of partitions is $N_L$, $N_L$ being smaller than $N_S$.

3. The object detector according to claim 2, wherein "$j=k*N_S$" and "$P_S=k*w$" are satisfied when the number of partitions is $N_S$, where j denotes a number of the light emitting areas of the light source, w denotes an amount of light emitted from a single light emitting area, and k denotes a natural number equal to or greater than 1.

4. The object detector according to claim 3, wherein "j=m*$N_L$" and "$P_L$=m*w" are satisfied when the number of partitions is $N_L$, where m denotes a natural number greater than the k.

5. The object detector according to claim 4, wherein "m/k" is a natural number that is closest to "$(L_L/L_S)^2$", where $L_S$ denotes detection distance when the number of partitions is $N_S$ and $L_L$ denotes detection distance when the number of partitions is $N_L$.

6. The object detector according to claim 1, wherein each of the plurality of light emitting areas includes a plurality of light-emitting units.

7. The object detector according to claim 1, further comprising:
processing circuitry configured to calculate distance to the object, based on a timing of light emission at the light source and a timing of light reception at the light receiver, when the light receiver receives light reflected at the object.

8. The object detector according to claim 7, wherein the processing circuitry obtains a shape of the object based on distance to the object for each light emitting direction of the light output from the optical scanner.

9. The object detector according to claim 1, wherein the first direction is the same as the third direction.

10. A sensing apparatus, comprising:
the object detector according to claim 1; and
a monitoring controller configured to obtain movement information of the object including at least one of presence or absence of movement of the object, a moving direction, and a moving speed of the object, based on an output from the object detector.

11. The sensing apparatus according to claim 10, further comprising:
a display configured to display at least one of position information and the movement information of the object.

12. The sensing apparatus according to claim 10, wherein
the sensing apparatus is provided on a vehicle, and
the monitoring controller determines whether or not there is danger based on at least one of position information and the movement information of the object.

13. The sensing apparatus according to claim 11, wherein
the sensing apparatus is provided on a vehicle, and
the monitoring controller determines whether or not there is danger based on at least one of the position information and the movement information of the object.

14. The object detector of claim 1, wherein the controller is further configured to select, from the plurality of light emitting areas, light emitting areas to be turned on.

* * * * *